US008714775B2

(12) United States Patent
Bracher et al.

(10) Patent No.: US 8,714,775 B2
(45) Date of Patent: May 6, 2014

(54) LIGHT FIXTURES, METHODS OF SUSPENDING A PLURALITY OF LIGHT SOURCES, AN ORNAMENT MOUNTING, AND A METHOD FOR MOUNTING AN ORNAMENT

(75) Inventors: Todd Bracher, Brooklyn, NY (US); Tho Ly, Plattsburgh, NY (US); Andrew Schuyler, Colchester, VT (US)

(73) Assignee: Swarovski Lighting, Ltd., Plattsburgh, NY (US)

( * ) Notice: Subject to any disclaimer, the term of this patent is extended or adjusted under 35 U.S.C. 154(b) by 496 days.

(21) Appl. No.: 13/084,283

(22) Filed: Apr. 11, 2011

(65) Prior Publication Data

US 2012/0257388 A1 Oct. 11, 2012

(51) Int. Cl.
*F21V 21/00* (2006.01)
*F16M 13/00* (2006.01)

(52) U.S. Cl.
USPC ........................ 362/249.01; 362/407; 362/391

(58) Field of Classification Search
USPC ...................................... 362/249.01, 391, 407
See application file for complete search history.

(56) References Cited

U.S. PATENT DOCUMENTS

| | | | | |
|---|---|---|---|---|
| 2,769,274 | A * | 11/1956 | Ougland | 43/105 |
| 3,978,610 | A * | 9/1976 | Stubbmann | 446/227 |
| 4,214,808 | A * | 7/1980 | Hampson | 359/616 |
| 6,193,384 | B1 * | 2/2001 | Stein | 362/96 |
| 7,267,463 | B2 * | 9/2007 | Bayer et al. | 362/441 |
| 7,347,594 | B2 * | 3/2008 | Bayer et al. | 362/433 |
| 8,256,151 | B2 * | 9/2012 | Stafford et al. | 40/617 |
| 8,425,084 | B2 * | 4/2013 | Myers et al. | 362/249.14 |
| 2006/0146547 | A1 | 7/2006 | Wu | |

FOREIGN PATENT DOCUMENTS

| | | |
|---|---|---|
| CN | 200986123 | 12/2007 |
| CN | 201568845 | 9/2010 |
| CN | 202195381 U | 4/2012 |
| EP | 2511600 | 10/2012 |
| GB | 2436138 | 9/2007 |

OTHER PUBLICATIONS

"Non Finito" metal and brass suspension light by Emiliano Solei and Britt Moran; image from blog archive dated Nov. 26, 2007, http://www.designspongeonline.com/2007/11/chandelier-guide.html.
"Pirce" aluminum suspension light by G.M. Scutella; image from blog archive dated Nov. 26. 2007, http://www.designspongeonline.com/2007/11/chandelier-guide.html.

(Continued)

*Primary Examiner* — Anabel Ton
(74) *Attorney, Agent, or Firm* — Heslin Rothenberg Farley & Mesiti P.C.

(57) ABSTRACT

Light fixtures, lighting methods, and devices for mounting ornaments are provided. The light fixtures and methods overcome the limitations of the prior art by permitting electrical power transmission to the light sources, such as, LEDs, through the light fixture suspension elements. The light fixtures include a first ring suspended by a plurality of first cords; and a second ring suspended by a plurality of second cords from the first ring; wherein at least one of the first ring and the second ring comprises a plurality of light sources; and wherein at least one of the plurality of first cords and at least one of the plurality of the second cords are adapted to transmit electrical power to the plurality of light sources. Methods of mounting light sources and ornament mounting arrangements are also disclosed.

47 Claims, 19 Drawing Sheets

(56) References Cited

OTHER PUBLICATIONS

"Burke" steel suspension light by Tina Leung; image from blog archive dated Nov. 26, 2007 http://www.designspongeonline.com/2007/11/chandelier-guide.html.

"Allegro Ritmico" suspension chandelier by Foscarini: image from blog archlve dated Nov. 26, 2007, http://www.designspongeonline.com/2007/11/chandelier-guide.html.

Chinese Office Action dated Jul. 19, 2013, from the Chinese Patent Office, for Chinese patent application No. CN201122555555U (which application published as CN202195381U), 7-pages.

* cited by examiner

LIGHT FIXTURES, METHODS OF SUSPENDING A PLURALITY OF LIGHT SOURCES, AN ORNAMENT MOUNTING, AND A METHOD FOR MOUNTING AN ORNAMENT

BACKGROUND OF THE INVENTION

1. Field of the Invention

The present invention relates, generally, light fixtures and methods for mounting light sources, particularly, to light fixtures having rings having light sources where the rings are suspended from cords adapted to transmit power to the light sources, for example, LEDs.

2. Description of Related Art

A light fixture must be electrically powered. Typically, power is provided to a light fixture by one or more electrical power cords. Historically, light fixture designers must incorporate the routing of electrical power to the lights in their fixtures. In the design of conventional fixtures, for example, chandeliers and lamps, some form of body, frame, or other structure is provided through which or along which electrical power cords and wires can be routed without incident. However, when light fixtures are designed with more delicate or ethereal appearances, structures within which power cords can be routed may not be available. Lacking such structures thought which the power cords can be routed, it is a challenge for the lighting designer to provide appropriate power to the fixture. Aspects of the present invention address this disadvantage of conventional lighting design.

SUMMARY OF ASPECTS OF THE INVENTION

Faced with the limitations of conventional methods of providing electrical power to lighting fixtures and the competing desire to provide an open, light, somewhat ethereal light fixture design, the inventors of the present invention overcame this challenge by incorporating the electrical power routing into the structures supporting the light fixture. According to aspects of the present invention, electrical power is provided to the light sources in a light fixture through the support cords or wires that suspend the light fixture.

One embodiment of the present invention is a light fixture including or comprising: a first ring suspended by a plurality of first cords; and a second ring suspended by a plurality of second cords from the first ring; wherein at least one of the first ring and the second ring comprises a plurality of light sources; and wherein at least one of the plurality of first cords and at least one of the plurality of the second cords are adapted to transmit electrical power to the plurality of light sources, for example, light emitting diodes (LEDs). The first ring and the second ring may be circular rings, elliptical rings, or polygonal rings. In one aspect, the plurality of light sources are positioned to direct light in an axial direction, for example, a vertical direction, for instance, an upward vertical direction and/or a downward vertical direction. In one aspect, the light fixture may further include at least one third ring suspended from at least one of the first ring and the second ring by a plurality of third cords. The at least one third ring may include a plurality of light sources positioned to direct light in an axial direction, and the plurality of third cords may be adapted to transmit electrical power to the plurality of light sources in the third ring.

Another embodiment of the invention is a method for suspending a plurality of light sources, the method including or comprising: suspending a first ring by a plurality of first cords; suspending a second ring by a plurality of second cords from the first ring, wherein at least one of the first ring and the second ring comprises a plurality of light sources and wherein at least one of the plurality of first cords and at least one of the plurality of the second cords are adapted to transmit electrical power; and powering the plurality of light sources through the at least one of the plurality of first cords 14 adapted to transmit electrical power and the at least one of the plurality of second cords adapted to transmit electrical power. In one aspect, the light directed from the lights sources may be directed in an axial direction, for example, an axial vertical direction, for instance, an upward vertical direction and/or a downward vertical direction.

Another embodiment of the invention is a light fixture including or comprising: a first circular ring suspended by a plurality of first cords, the first circular ring having an outer diameter and a first plurality of light sources positioned to direct light in an axial direction; and a second circular ring suspended by a plurality of second cords from the first circular ring, the second circular ring having an outer diameter greater than the outer diameter of first circular ring and a second plurality of light sources positioned to direct light in an axial direction; wherein at least one of the plurality of first cords is adapted to transmit electrical power to the first plurality of light sources; and wherein at least one of the plurality of the second cords is adapted to transmit electrical power to the second plurality of light sources, for example, LEDs. In one aspect, the light fixture may further include at least one third circular ring suspended from at least one of the first circular ring and the second circular ring by a plurality of third cords, the at least one third circular ring having a third plurality of light sources positioned to direct light in a downward direction, and wherein at least one of the plurality of the third cords is adapted to transmit electrical power to the third plurality of light sources. In one aspect, the light fixture may further include a plurality of ornaments mounted to at least one of the plurality of first cords, the plurality of second cords, or the plurality of third cords.

A further embodiment of the invention is an ornament mounting including or comprising: a cord; an ornament having a through hole extending through the ornament; and a ferrule having a cylindrical body adapted to engage the cord, for example, crimpable to cord, the cylindrical body having a first end having a first width less than a width of the through hole of the ornament, and a second end having a second width greater than the first width; wherein, when the ferrule is engaged to the cord and the cord is passed through the through hole of the ornament, the first width of the first end of the ferrule penetrates into the through hole in the ornament and the second width of the second end of the ferrule engages the through hole of the ornament and supports the ornament on the cord. In one aspect, the cord is suspended in a substantially vertical direction. In another aspect, the ferrule does not protrude from the through hole of the ornament.

A still further embodiment of the invention is a method of mounting an ornament having a through hole, the method including or comprising: mounting a ferrule to a cord, for example, a wire, the ferrule having a cylindrical body adapted to engage the cord, the cylindrical body having a through hole, a first end having a first width less than a width of the through hole of the ornament, and a second end having a second width greater than the first width; passing the cord through the though hole of the ornament wherein the first end of the ferrule penetrates the through hole of the ornament; and engaging the through hole of the ornament with the second end of the ferrule to support the ornament on the cord. In one aspect, after the method is practiced, the cord is suspended in a substantially vertical direction. In another aspect, mounting the ferrule to the cord comprises crimping the ferrule to the cord.

Details of these aspects of the invention, as well as further aspects of the invention, will become more readily apparent upon review of the following drawings and the accompanying claims.

BRIEF DESCRIPTION OF THE FIGURES

The subject matter that is regarded as the invention is particularly pointed out and distinctly claimed in the claims at the conclusion of the specification. The foregoing and other features and advantages of the invention will be readily understood from the following detailed description of aspects of the invention taken in conjunction with the accompanying drawings in which:

DETAILED DESCRIPTION OF FIGURES

Figure 1:
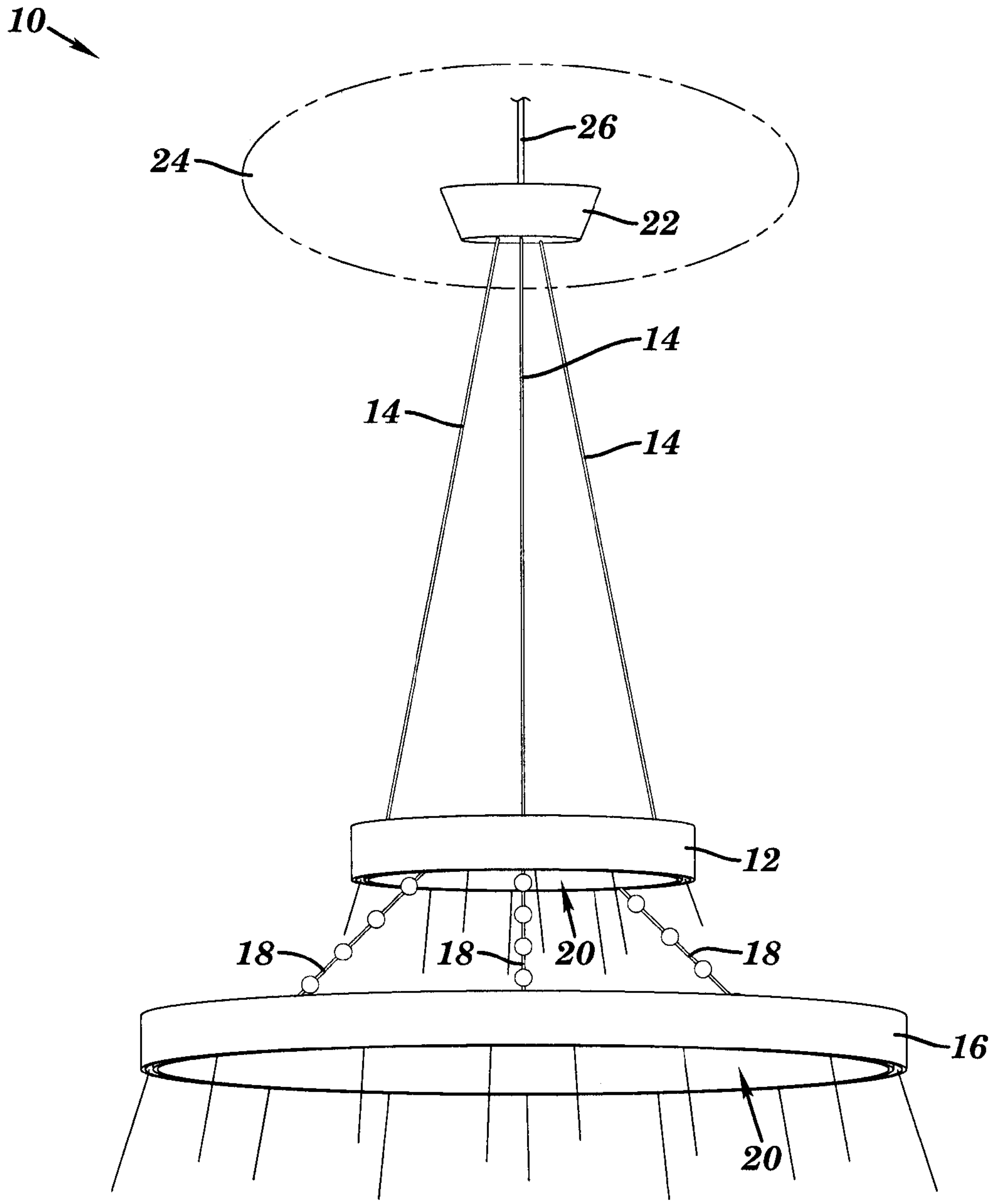
FIG. 1 is a perspective view of a light fixture according to one aspect of the invention.
Figure 2:
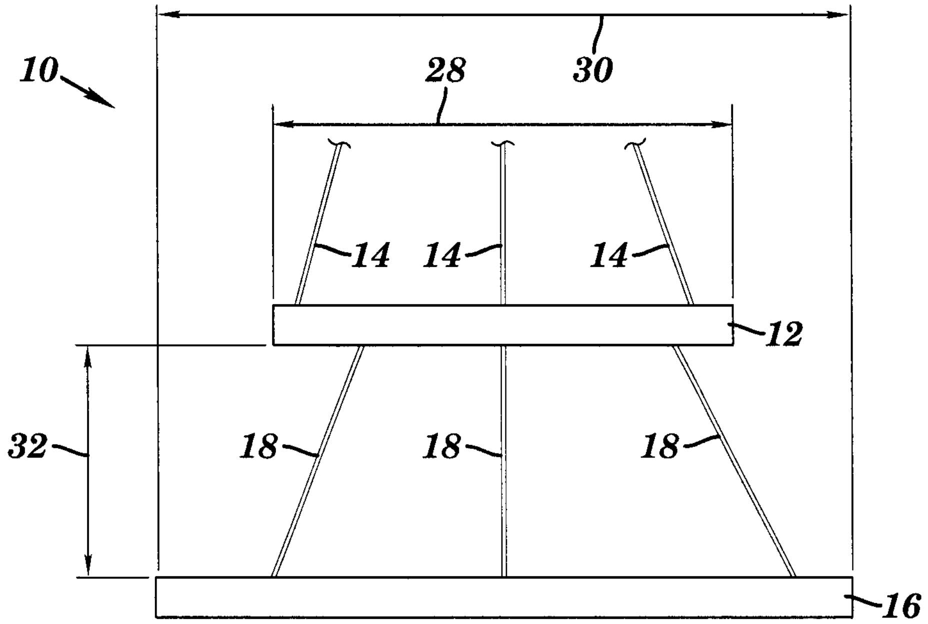
FIG. 2 is a partial front elevation view of the fixture shown in FIG. 1, the partial side elevation view being substantially identical.
Figure 3:
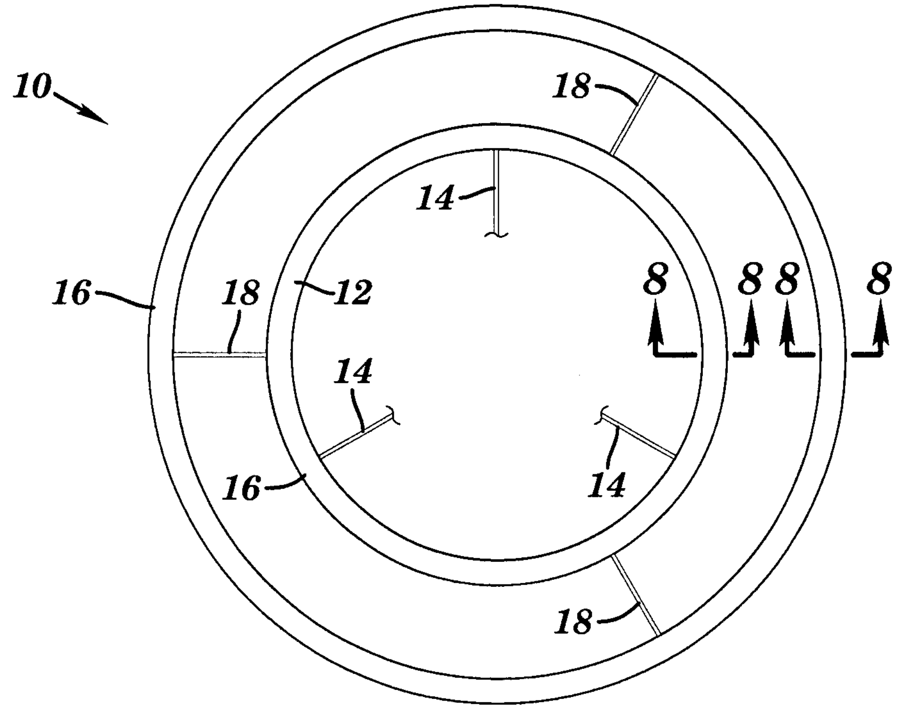
FIG. 3 is a partial top plan view of the fixture shown in FIG. 1.

The details and scope of the aspects of the present invention can best be understood upon review of the attached figures and their following descriptions. FIG. 1 is a perspective view of a light fixture 10 according to one aspect of the invention. FIG. 2 is a partial front elevation view of fixture 10, the partial side elevation view being substantially the same as FIG. 2, and FIG. 3 is a partial top plan view of the fixture shown in FIG. 1. As shown, light fixture 10 includes a first ring 12 suspended by a plurality of first cords 14, and a second ring 16 suspended by a plurality of second cords 18 from first ring 12. According to aspects of the invention, the first ring 12, the second ring 16, or both include a plurality of light sources, for example, light-emitting diodes, not shown but indicated by arrows 20 in FIG. 1. In addition, according to aspects of the invention, at least one of the plurality of first cords 14 and at least one of the pluralities of the second cords 18 may comprise a wire adapted to transmit electrical power to the plurality of light sources 20.

As shown in FIG. 1, light fixture 10 may typically include a mounting escutcheon or canopy assembly 22 by which fixture 10 may be mounted to a surface 24 (shown in phantom), for example, to a ceiling or overhang. Electric power may typically be provided to canopy assembly 22 via electrical wire or cable 26, for example, conventional 120 or 240 volt AC power from the local electrical grid, though one or more batteries may be located in canopy 22. As discussed above and below, according to aspects of the present invention, electrical power may be directed from wire 26 to canopy assembly 22 and then to cords 14 and/or cords 18 to power light sources 20 in rings 12 and 16. Details of this electrical power distribution will be descried with respect to FIGS. 10, 11, and 12 below.

As shown in FIG. 2, rings 12 and 16 may typically vary in outside dimension. In one aspect, ring 12 may have an outside dimension 28, for example, a maximum lateral dimension, such as, a width or diameter, and ring 16 may have an outside dimension 30, for example, a maximum lateral dimension, such as, a width or diameter. In one aspect, maximum lateral dimension 28 may be substantially equal to maximum outside dimension 30, however, typically, ring 12 may have smaller maximum outside dimension 28 than maximum outside dimension 30 of ring 16. In another aspect, ring 12 may have larger maximum outside dimension 28 than maximum outside dimension 30 of ring 16. According to aspects of the invention, lateral dimensions 28 and 30, for example, diameters, may typically range from about 50 millimeters [mm] to about 10 meters [m], but are typically between about 200 mm and 1 m in outside dimension. For example, width or diameter 28 may range from about 2 m to about 5 m and the width or diameter 30 may range from about 2 m to about 5 m.

As also shown in FIG. 2, rings 12 and 16 may be separated by a vertical dimension 32, for example, a height or an elevation. According to aspects of the invention, vertical dimension 32 may typically range from about 50 mm to about 5 m, but is typically between about 100 mm and 500 mm. For example, vertical dimension 32 may range from about 200 mm to about 400 mm.

Figure 5:
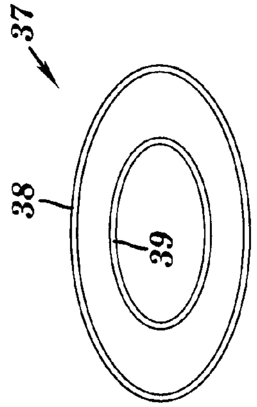
FIGS. 4 through 7 are top plan views, similar of FIG. 3, of light fixtures according to further aspects of the invention.
Figure 7:
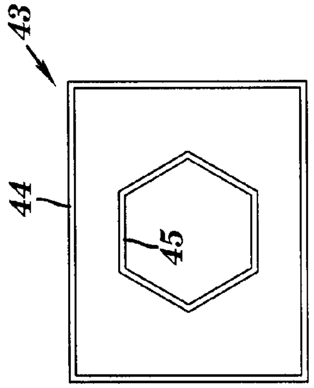
Figure 4:
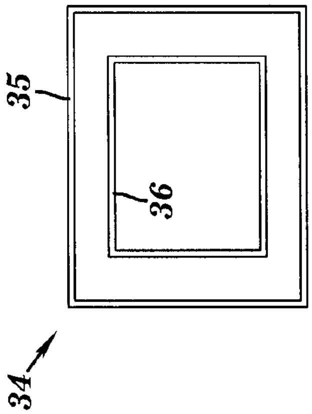
Figure 6:
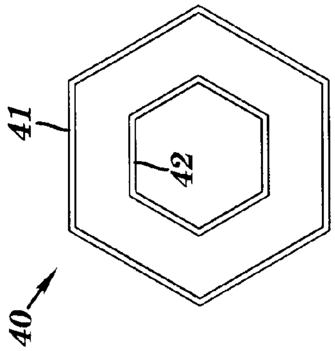

As shown most clearly in the top plan view of FIG. 3, in one aspect of the invention, first ring 12 and second ring 16 may be circular in shape. However, rings 12 and 16 may comprise a broad range of geometric shapes according to aspects of the invention. For example, rings 12 and 16 may also be elliptical rings or polygonal rings, for example, triangular rings, square rings, rectangular rings, pentagonal rings, hexagonal rings, or octagonal rings, among other polygonal ring shapes. FIGS. 4 through 7 are top plan views, similar of FIG. 3, of light fixtures according to further embodiments of the invention having various shapes for rings 12 and 16. For example, as shown in FIG. 4, light fixture 34 may have rings 35 and 36 that are rectangular in shape; as shown in FIG. 5, light fixture 37 may have rings 38 and 39 that are elliptical in shape; and, as shown in FIG. 6, light fixture 40 may have rings 41 and 42 that are hexagonal in shape. As shown in FIG. 7, rings 12, 16 may also vary in geometric shape, for example, light fixture 43 shown in FIG. 7 may have a ring 44 that is rectangular in shape and a ring 45 that is hexagonal in shape. Other combinations of shapes for two (or, as discussed below, three) or more rings 12, 16, may be provided according to aspects of the invention, and the myriad of possible combinations of ring shapes will be readily apparent to those of skill in the art without further elaboration.

Figure 8:
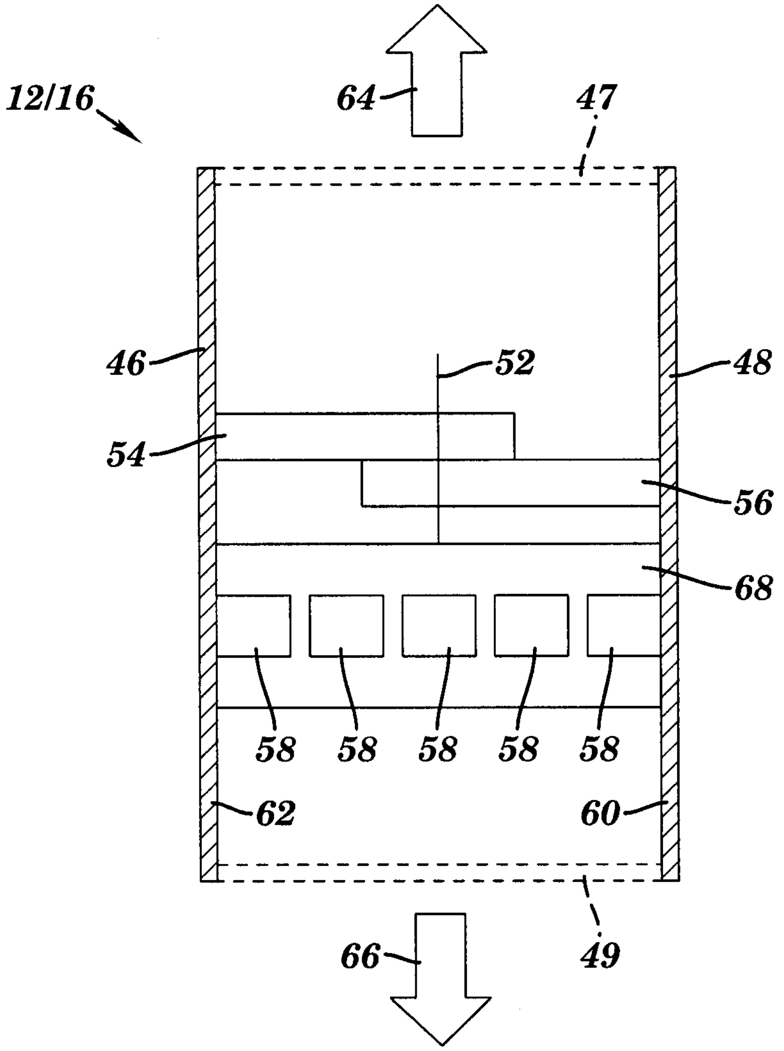
FIG. 8 is cross-sectional view of the rings shown in FIG. 3 as viewed along the two sets of section lines 8-8 shown in FIG. 3.
Figure 9:
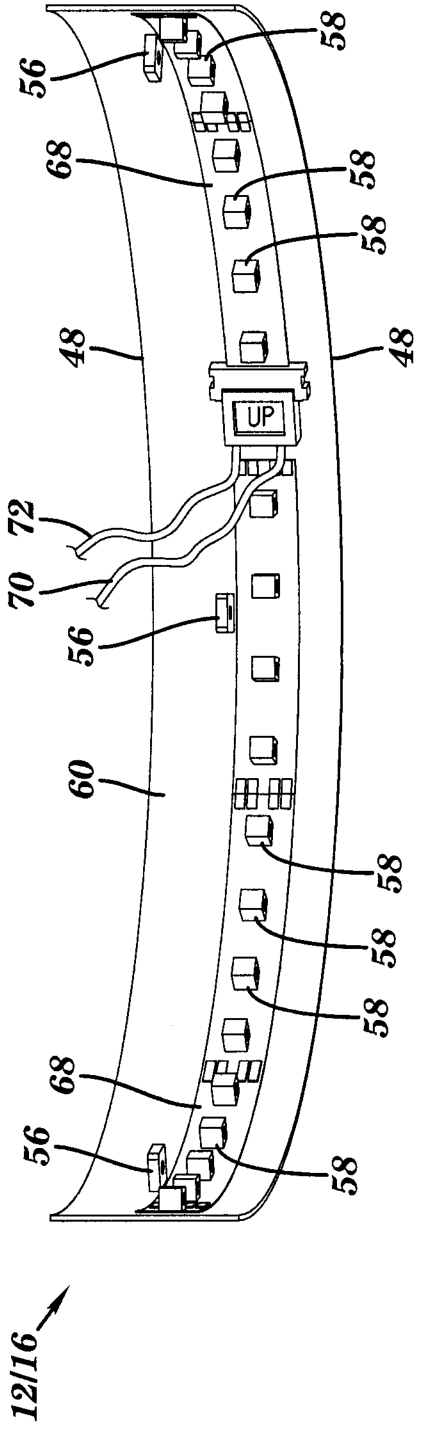
FIG. 9 is a partial perspective view of a ring with light sources according to one aspect of the invention.

FIG. 8 is cross-sectional view of the rings 12 and 16 shown in FIG. 3 as viewed along the two sets of section lines 8-8 shown in FIG. 3. FIG. 9 is a partial perspective view of rings 12 and/or 16 according to one aspect of the invention. As shown in FIGS. 8 and 9, rings 12 and/or 16 may comprise hollow rings having an inner wall 46 and an outer wall 48. Timer wall 46 and outer wall 48 may be joined or coupled by any conventional means, for example, mechanical fasteners or welding. In the aspect, shown in FIG. 8, inner wall 46 and outer wall 48 may be joined by plurality of mounting plates 54 mounted on inner wall 46 and a plurality of mounting plate 56 mounted on outer wall 48, by a plurality of mechanical fasteners 52. Mounting plates 54 and 56 may be mounted on inner wall 46 and outer wall 48, respectively, by welding or brazing. In some aspects of the invention, rings 12 and 16 may include a top wall or plate 47 and/or a bottom wall or plate 49 (both shown in phantom in FIG. 8). Top wall 47 and/or bottom wall 49 may completely encircle or cover rings 12 and 16, or may intermittently cover rings 12 and 16, for example, providing a plurality of openings or gaps between individual sections of top wall 47 and/or bottom wall 49. Inner wall 46, top wall 47, outer wall 48, and bottom wall 48 may be opaque, translucent, or transparent. In the aspect of the invention shown in FIGS. 8 and 9, inner wall 46 and outer wall 48 of rings 12 and 16 are opaque, for example, typically comprising thin gauge sheet metal, though plastics may be used.

FIGS. 8 and 9 also illustrate a plurality of light sources 58 that may be mounted in rings 12 and 16 according to aspects of the invention. Though, according to the invention, different types of light sources 58 may be used, for example, incandescent bulbs, fluorescent bulbs, and the like, in the aspect of the invention shown in FIGS. 8 and 9, light sources 58 comprise light-emitting diodes (LEDs) mounted to the inner surface 60 of outer wall 48 of rings 12 and 16. According to some aspect of the invention, light sources 58 may be mounted to the inner surface 62 of inner wall 46 of rings 12 and 16. In one aspect, for example, for larger embodiments of the invention, light sources 58 may be mounted to both surfaces 60 and 62. In addition, light sources 58 may direct light in any desired direction, but light sources 58 typically may direct light in an axial direction, that is, in a direction generally parallel to the axis of the light fixture. For example, in one aspect, light may be directed by light sources 58 in a vertical direction, such as, an upward vertical direction, as indicated by arrow 64 in FIG. 8, a downward vertical direction, as indicated by arrow 66, or both. Light sources 58 may be mounted to surfaces 60 or 62 of ring 12 or 16 by conventional means, for example, by mechanical fasteners or by an adhesive. In the aspect shown in FIGS. 8 and 9, light sources 58, that is, LEDs, are mounted to a strip 68 having an adhesive adapted to mount strip 68 with light sources 58 to surface 60, 62, or both. In one aspect of the invention, the strip-mounted LEDs used for light sources 58 may be model number L32LFE/10V765/SD/14FT strip-mounted LEDs provided by Osram Sylvania.

As shown in FIG. 9, light sources 58 may typically be electrically powered by electrical leads or wires 70 and 72, for example, with direct current (DC), for instance, 10 to 50 volts DC (VDC) or alternating current (AC), for instance, 120 volts AV (VAC) or 240 VAC. As discussed below, according to one aspect of the invention electrical power may be provided to light sources 56 through cords 14 and/or cords 18, that is, via the cords supporting rings 12 and 16.

FIGS. 1 through 10 also illustrate a method for suspending a plurality of light sources according to one aspect of the invention. The method includes or comprise: suspending a first ring 12 by a plurality of first cords 14; and suspending a second ring 16 by a plurality of second cords 18 from the first ring 12, wherein at least one of the first ring 12 and the second ring 16 comprises a plurality of light sources 58 and wherein at least one of the plurality of first cords 14 and at least one of the plurality of the second cords 18 are adapted to transmit electrical power; and powering the plurality of light sources 58 through the at least one of the plurality of first cords 14 adapted to transmit electrical power and the at least one of the plurality of second cords 18 adapted to transmit electrical power. In one aspect, the method further comprises directing light from the light sources 58 in an axial direction, for example, an upward vertical direction and/or a downward vertical direction.

Figure 10:
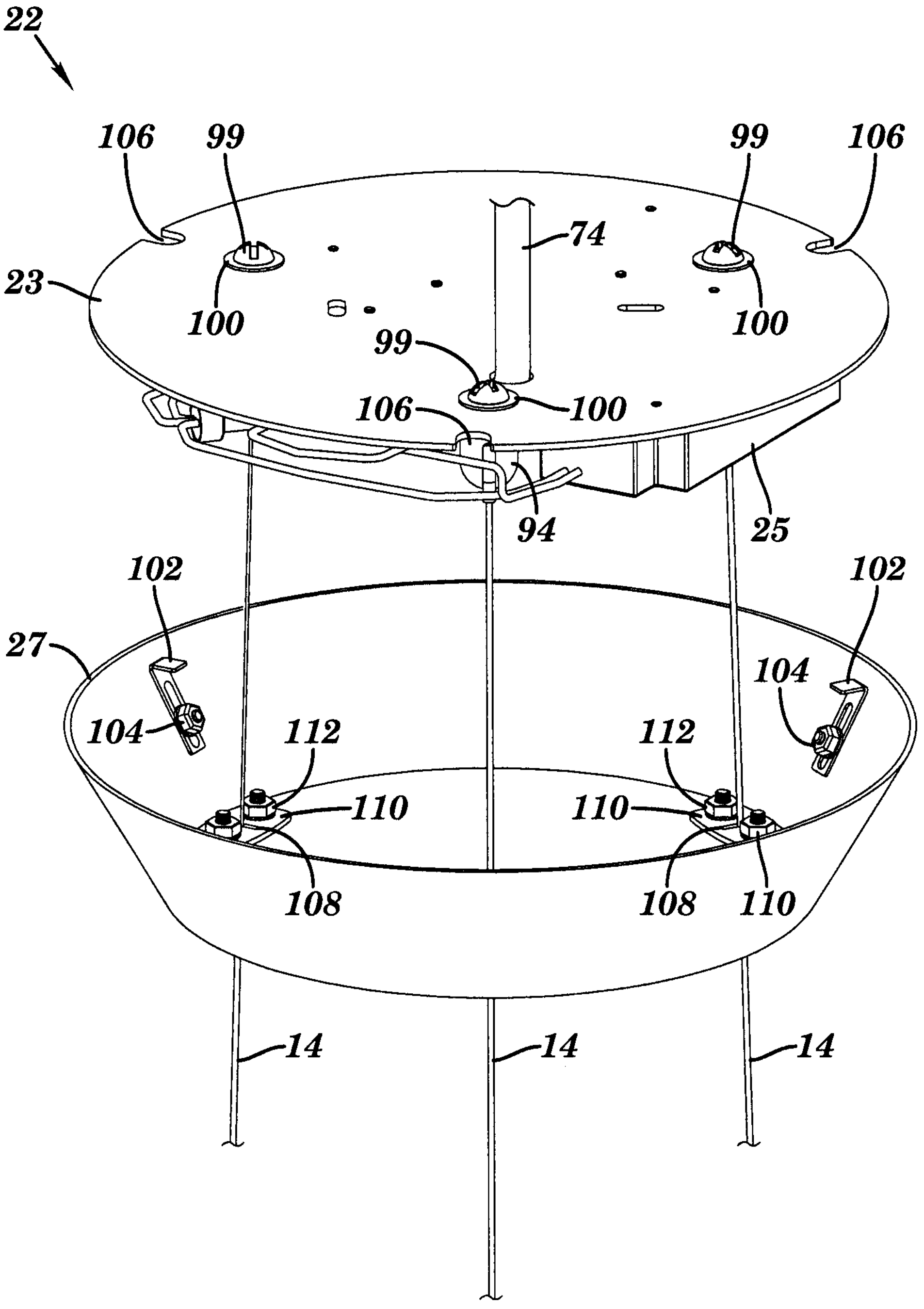
FIG. 10 is an exploded perspective view of the canopy assembly shown in FIG. 1 according to one aspect of the invention.
Figure 11:
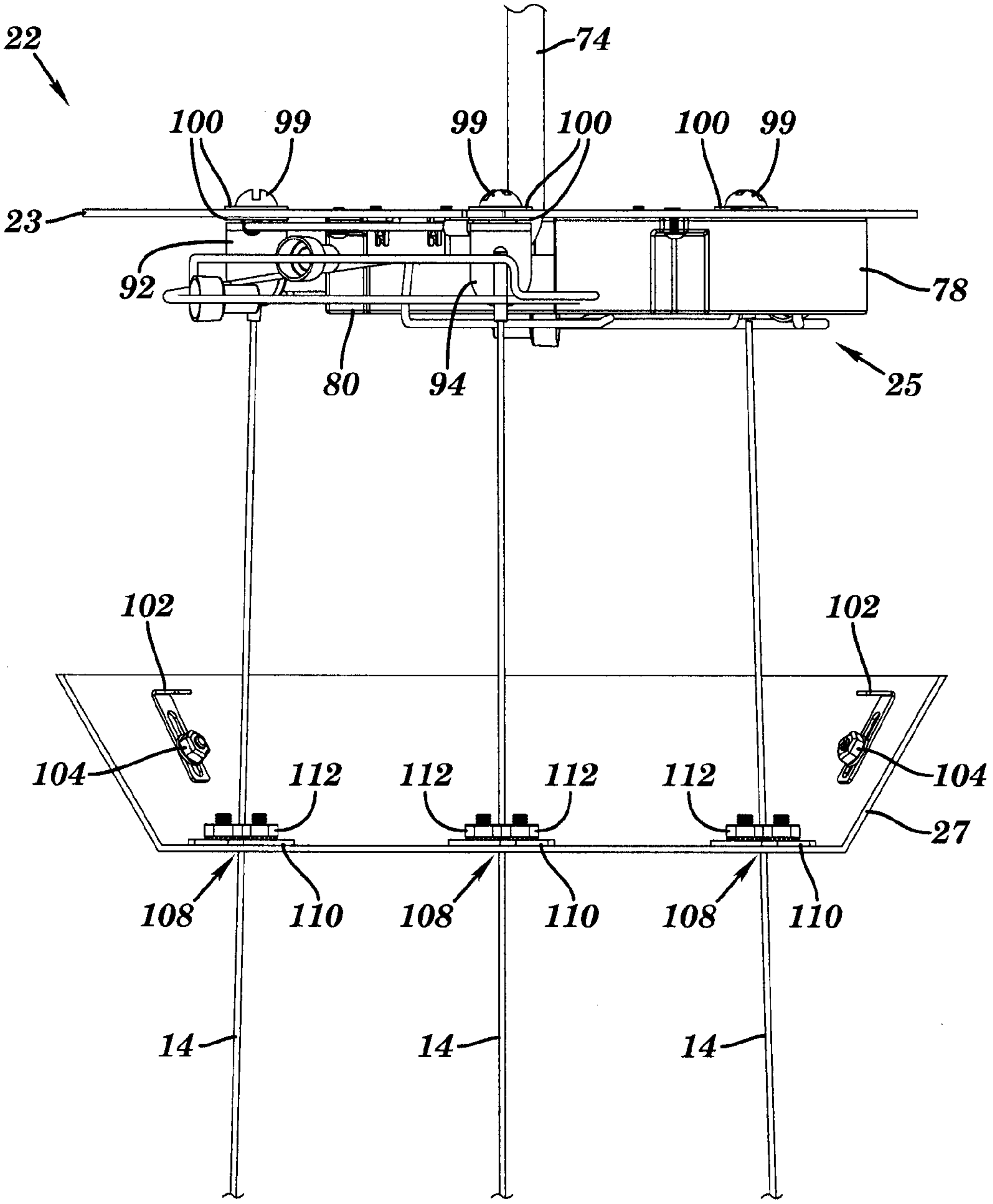
FIG. 11 is a side elevation view of the exploded perspective view of the canopy assembly shown in FIG. 10.

FIG. 10 is an exploded perspective view of the canopy assembly 22 shown in FIG. 1 according to one aspect of the invention. As shown, canopy assembly 22 includes a mounting plate, or "washer," 23 adapted to secure light fixture 10 to surface 24 (see FIG. 1), one or more power supplies, wiring, and electronics 25 mounted to mounting plate 23, supporting cords 14 mounted to mounting plate 23, and a canopy cover 27 mounted over power supply, wiring and associated electronics 25 and to mounting plate 23. FIG. 11 is a side elevation view of the exploded perspective view of the canopy assembly 22 shown in FIG. 10 and FIG. 12 is a bottom perspective view of the canopy assembly 22 shown in FIG. 10 with the canopy cover 27 removed to facilitate illustration of aspects of the invention.

Figure 12:
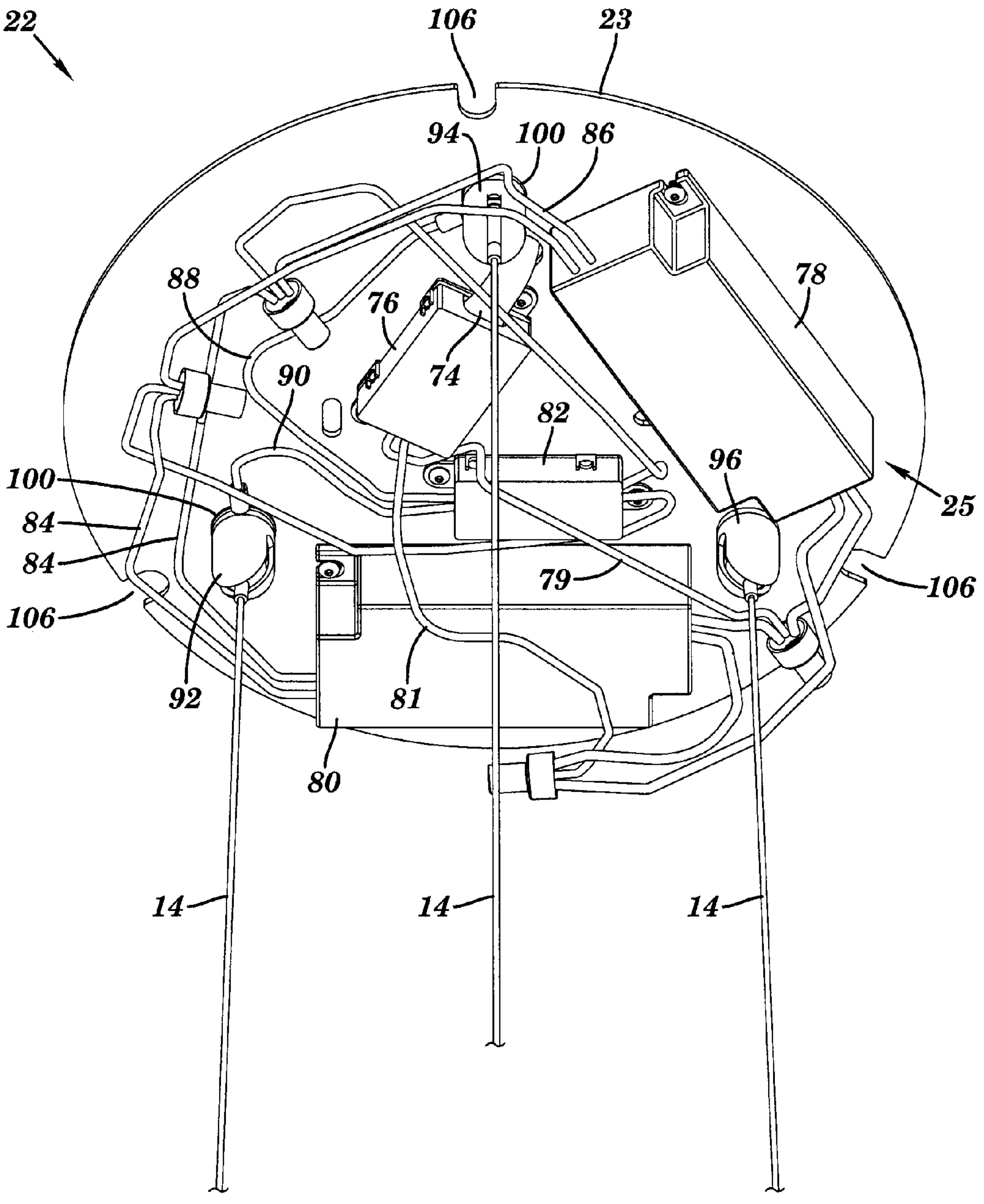
FIG. 12 is a bottom perspective view of the canopy assembly shown in FIG. 10 with the canopy cover removed to facilitate illustration of aspects of the invention.

As shown in FIGS. 10, 11, and 12 the mounting plate 23 of canopy assembly 22 may be a thin, typically, metallic, plate adapted to be mounted to surface 24, for example, bolted to an electrical junction box (not shown) located behind surface 24 (see FIG. 1). As shown most clearly in FIG. 12, one or more power supplies, wiring, and electronic 25 may typically be mounted to one surface of mounting plate 23 and the plurality of cords 14 that suspend rings 12 and 16 may be mounted to or suspended from mounting plate 23.

As is typical, electrical power may be provided to canopy assembly 22 of light fixture 10 by a wire 74, for example, a Romex-type sheathed electrical cable, as is conventional, though in some aspects of the invention electrical power may be provided by one or more batteries positioned in canopy assembly 22. According to an aspect of the invention, the electrical power provided, for example, by wire 74, is conditioned or otherwise modified to provide electrical power to one or more support cords 14 whereby the one or more support cords 14 provide electrical power to the light sources 58 in ring 12 and/or ring 16. That is, according to one aspect, cords 14 may function as not only support to ring 12 and/or ring 16, but may also conduits for transmitting electrical power to the light sources 58 of ring 12 and/or ring 16.

According to aspects of the invention, any combination of electronics and wiring 25 that effectively provide an appropriate level of electrical power from, for example, wire 74 to cords 14 and/or cords 18 to power light sources 58 may be used, and will be apparent to those of skill in the art. However, one effective arrangement of power supplies, wiring, and associated electronics 25 that may be used is illustrated most clearly in FIG. 12.

Electrical power, for example, 120 VAC at between about 5 and 120 amperes (A), depending upon the size and number of light sources 58, may be provided by wire 74 to canopy assembly 22. As shown in FIG. 12, electrical power supplied by wire 74 may be introduced to a connection box 76. Connection box 76 may simply provide an interface between the supply voltage, for example, 120-240 VAC, and the electrical components 25. As shown in FIG. 12, the wires 79 and 81 from connection box 76 may provide electrical power, for example, 120-240 VAC, to at least one, but typically, two, power supplies 78 and 80 via wires 79 and 81, respectively. Power supplies 78 and 80 may be typical power supplies adapted to convert supply voltage, for example, 120-240 VAC, to an appropriate voltage for powering light sources 58, for example, about 10 to about 50 VDC. It will be apparent to those of skill in the art that, if the supply voltage provided by wire 74 is compatible with the voltage required for light sources 58, for example, about 10 VDC, power supplies 78 and 80 may be omitted. The output of power supplies 78 and 80, for example, about 10 to about 50 VDC, is provided to connection box 82 via wires 84 and 86. Connection box 82 provides a common junction for providing power, in one case, 10 VDC to cords 14. In one aspect, only a single power supply, 78, 80 may be used to power aspects of the invention; however, two or more redundant power supplies 78, 80 may be provided to help ensure the desired power is provided and to extend the working life of the power supplies.

The output of connection box 82 is electrically connected to cords 14 via wires 88 and 90. As shown in FIG. 12, in one aspect, wires 88 and 90 may be electrically connected to cord mounts 92 and 94, for example, by means of connectors mechanically fastened to cord mounts 92 and 94. At least one other cord mount 96 may be provided to mount a third cord 14 to plate 23. Cord mounts 92, 94, and 96 may be mounted to plate 23 by mechanical fasteners 99, for example, screws, as shown most clearly in FIGS. 10 and 11. In one aspect of the invention, cord mounts 92, 94, and 96 may be model 12-BS-1420 gripper cord mounts provided by Griplock Systems, Inc. of Carpinteria, Calif., though other types of cord mounts may be used depending upon the size and weight of the fixture 10. The cord mounts and the connecting hardware may be electrically insulated from plate 23. For example, insulating rings 100, for instance, plastic insulating rings, such as, rings made of GE Lexan® polycarbonate or its equivalent, may be used to electorally insulate cord mounts 92, 94, and 96 and fasteners 99 from plate 23. Insulating rings 100 may be positioned on both sides of plate 23 (see FIGS. 10 and 11) to insulate cord mounts 92, 94, and 96 and mechanical fasteners 99 from plate 23. Cords 14 may be conventional wire cables, for example, AG-16-87-xxx, AG-24-01-xxx, or AG-30-20-xxx galvanized cables provided by Griplock Systems, Inc., for example, depending upon the current required in cables 14, or a 1/16-inch nominal diameter galvanized wire, for example, model number 3EACO23801, provided from W.A.C. of China, or their equivalents.

The canopy cover 27 is design to mount to plate 23 to conceal the electronic components 25 and allow cords 14 to pass through the cover 27 so cords 14 can support ring 12 and/or ring 16. As shown in FIGS. 10 and 11 canopy cover 27 may be frusto-concial in shape, but may take any geometry shape, including circular cylindrical and polygonal cylindrical, while providing the desired functions. Cover 27 may be mounted to plate 23 by conventional means, for example, by means of mechanical fasteners. For in the aspect shown, cover 27 may be mounted to plate 23 by means of a plurality of brackets 102 mounted by fasteners 104 to the inside of cover 27, for example, nuts threaded to threaded studs mounted on cover 27. Brackets 102 are positioned and adapted to pass through recesses 106 in the edge of plate 23 and, when cover 27 is rotated, engage plate 27 to retain cover 27 on plate 23. The engagement of brackets 102 to plate 23 is typically reversible whereby brackets 102 may disengage plate 23 when cover 27 is rotated whereby brackets 102 pass through recesses 106.

Canopy cover 27 includes at least two, but typically, three, through holes 108 through which cords 14 can pass. As noted above, in one aspect, at least some of cords 14 may transmit electric power. Therefore, according to one aspect of the invention, in order to minimize the likelihood of electric shocks or shorts, cords 14 may be electrically insulated from cover 27, which may typically be metallic, by one or more insulators 110, for example, plastic insulators, for instance, GE Lexan polycarbonate insulators. As shown in FIGS. 10 and 11, aspects of the invention may include insulators 110 comprising insulating disks having a through hole positioned to pass cord 14 and mounted about through holes 108 to electrically insulate cords 14 from cover 27. Insulating disks 110 may be mounted to cover 27 with mechanical fasteners, for example, with fasteners 112, for example, nuts threaded to threaded studs mounted on cover 27.

FIGS. 1-12 and their above descriptions provide a comprehensive description of aspects of the present invention. FIGS. 13 through 16 are perspective views, similar to FIG. 1, of light fixtures according to further aspects of the invention. The light fixtures illustrated in FIGS. 13 through 16 may typically include the features of the invention described and disclosed with respect to FIGS. 1 through 12.

Figure 13:
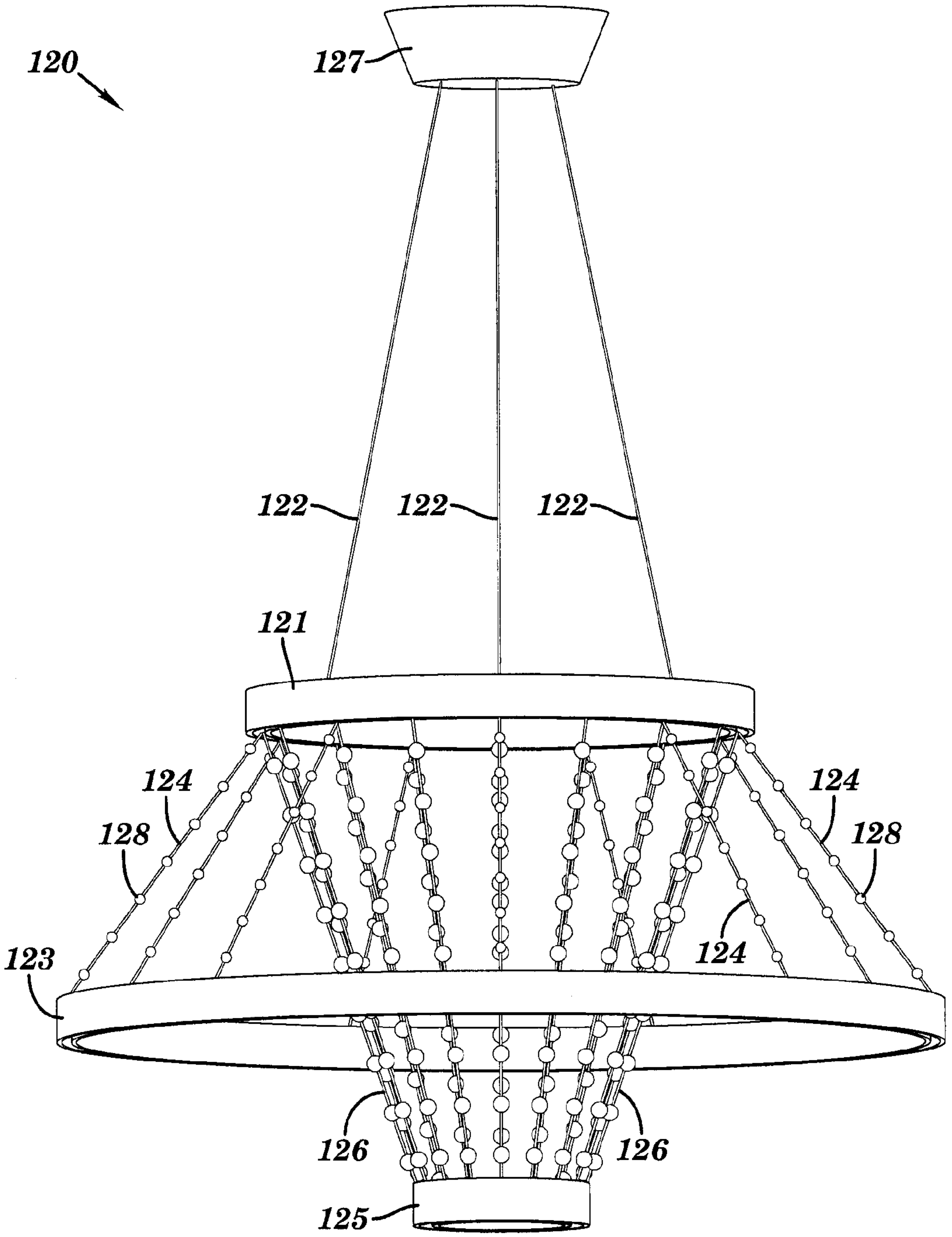
FIGS. 13 through 16 are perspective views, similar to FIG. 1, of light fixtures according to further aspects of the invention.

FIG. 13 is a perspective view of a light fixture 120 having a first ring 121 suspended by a plurality of first cords 122, a second ring 123 suspended by a plurality of second cords 124 from first ring 121, and—in contrast to light fixture 10 shown in FIG. 1—a third ring 125 suspended from first ring 121 by third cords 126. In one aspect, third ring 125 may be suspended from second ring 123 instead of from first ring 121. According to aspects of the invention, the first ring 121, the second ring 123, the third ring 125, or any combination of the three rings may include a plurality of light sources, for example, LEDs. The light sources may be mounted to any one of the rings of fixture 120 as shown and described with respect to FIGS. 8 and 9.

In addition, according to aspects of the invention, at least one of the plurality of first cords 122 of light fixture 120, at least one of the plurality of the second cords 124, and/or at least one of the plurality of third cords 126 may comprise one or more wires adapted to transmit electrical power to the plurality of light sources in rings 121, 123, and/or 125. As described in FIGS. 10-12 above, light fixture 120 typically includes a canopy assembly 127 adapted to mount to a surface, and provide electrical power to one or more of cords 122, 124, and/or 126 to illuminate light sources in any one or more of the rings. At least some of the cords 122, 124, and/or 126 may include ornaments 128 as described below with respect to FIGS. 17 through 20.

Figure 14:
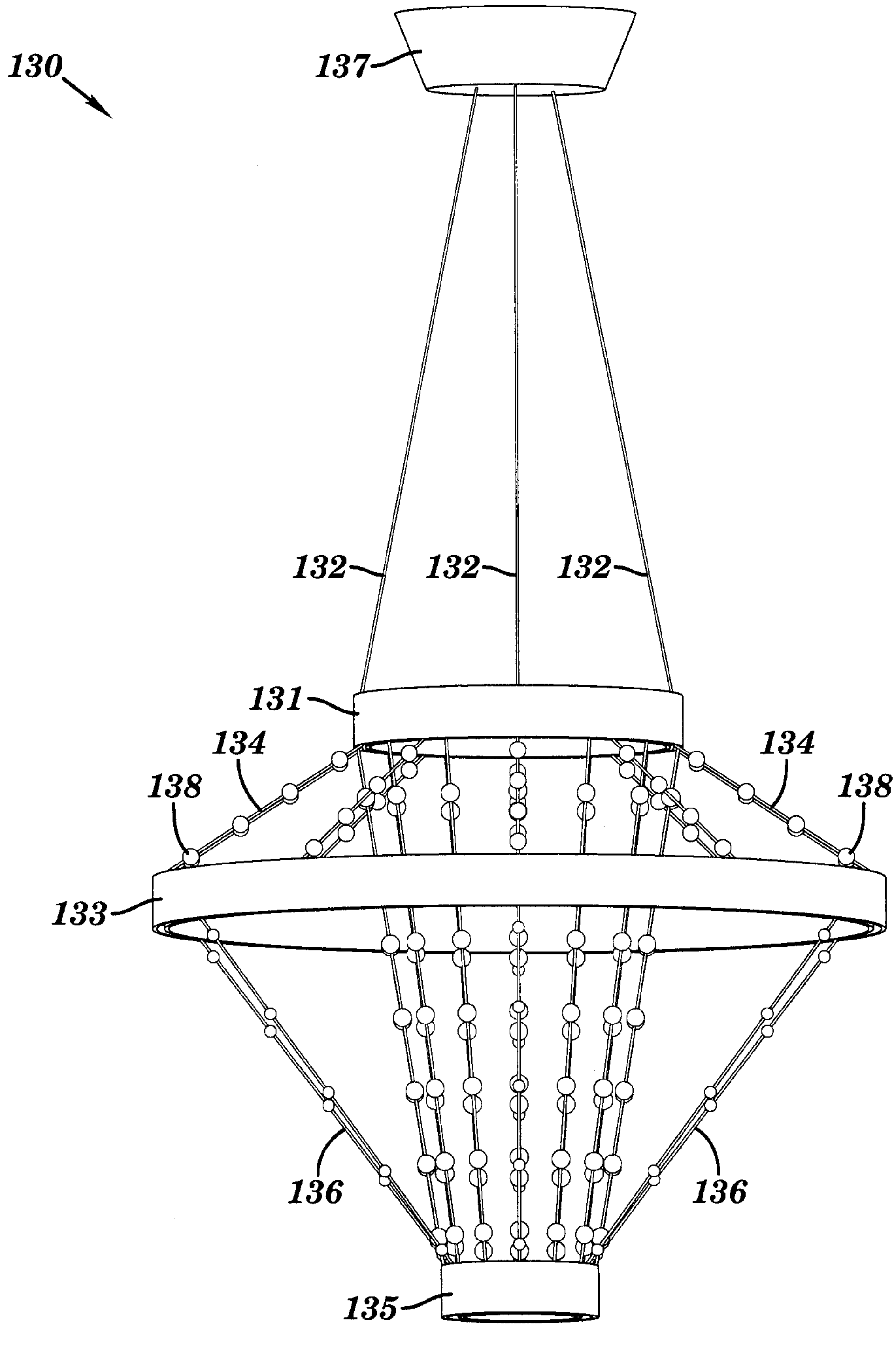

FIG. 14 is a perspective view of a light fixture 130 having a first ring 131 suspended by a plurality of first cords 132, a second ring 133 suspended by a plurality of second cords 134 from first ring 131, and a third ring 135 suspended from first ring 131 by third cords 136. In one aspect, third ring 135 may be suspended from second ring 133 instead of from first ring 131. According to aspects of the invention, the first ring 131, the second ring 133, the third ring 135, or any combination of the three rings may include a plurality of light sources, for example, LEDs. The light sources may be mounted to any one of the rings of fixture 130 as shown and described with respect to FIGS. 8 and 9.

In addition, according to aspects of the invention, at least one of the plurality of first cords 132 of light fixture 130, at least one of the plurality of the second cords 134, and/or at least one of the plurality of third cords 136 may comprise one or more wires adapted to transmit electrical power to the plurality of light sources in rings 131, 133, and/or 135. As described in FIGS. 10-12 above, light fixture 130 typically includes a canopy assembly 137 adapted to mount to a surface, and provide electrical power to one or more of cords 132, 134, and/or 136 to illuminate light sources in any one or more of the rings. At least some of the cords 132, 134, and/or 136 may include ornaments 138 as described below with respect to FIGS. 17 through 20.

As shown in FIGS. 13 and 14, according to one aspect of the invention, a light fixture may be provided having, in addition to a first ring 121, 131 and a second ring 123, 133, at least one third ring 125, 135 suspended from at least one of the first ring 121, 131 and the second ring 123, 133 by a plurality of third cords 126, 136. The at least one third ring 125, 136 may also comprise a plurality of light sources positioned to direct light in an axial direction, for example, axially upward and/or axially downward. Also, in one aspect, at least one of the plurality of third cords 126, 136 may comprise a wire adapted to transmit electrical power to the plurality of light sources in the third ring 125, 135.

As shown in FIGS. 13 and 14, the third ring 125, 135 may be positioned below first ring 121, 131 and second ring 123, 133 and be smaller in relative size than first ring 121, 131 and second ring 123, 133, for example, have a smaller outside dimension, for example, a smaller maximum lateral dimension 28 or 30 as shown in FIG. 2, such as, a width or diameter. However, in one aspect of the invention, the third ring 125, 135 may be positioned above first ring 121, 131 and second ring 123, 133 or between first ring 121, 131 and second ring 123, 133. In addition, third ring 125, 135 may be larger in relative size than first ring 121, 131 and second ring 123, 133, or even approximately the same relative size as either first ring 121, 131 and second ring 123, 133. In one aspect, first ring 121, 131; second ring 123, 133; and third ring 125, 135 may also be approximately the same relative size. First ring 121, 131; second ring 123, 133; and third ring 125, 135 may have a similar range of dimensions described with respect to FIGS. 2 and 3 above, and may have the similar features and construction as described with respect to FIGS. 8 and 9 above.

Figure 15:
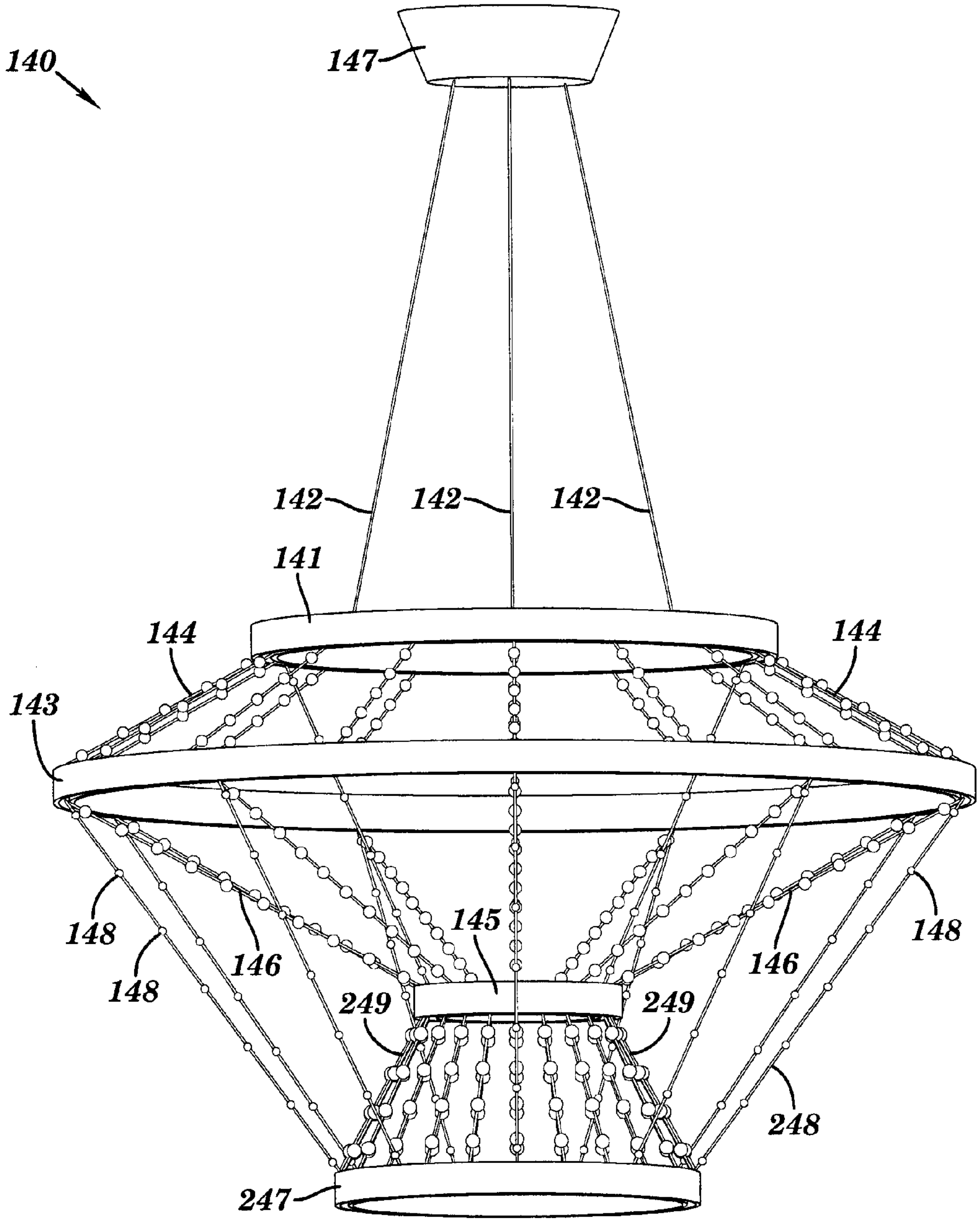

FIG. 15 is a perspective view of a light fixture 140 having a first ring 141 suspended by a plurality of first cords 142, a second ring 143 suspended by a plurality of second cords 144 from first ring 141, a third ring 145 suspended from second ring 143 by third cords 146, and—unlike light fixtures 120 and 130 shown in FIGS. 13 and 14, respectively, —a fourth ring 247 suspended by a plurality of fourth cords 248 from second ring 143 and a plurality of fifth cords 249 from third ring 145. In one aspect, fourth ring 247 may be suspended from second ring 143 alone by the plurality of cords 248, from third ring 145 alone by the plurality of cords 249, or from first ring 141 alone by a plurality of cords (not shown) or from first ring 141 and from second ring 143 or from third ring 145. Other possible mounting arrangements may be recognizable to those of skill in the art while still being within the purview of the present invention. According to aspects of the invention, the first ring 141, the second ring 143, the third ring 145, fourth ring 247, or any combination of the four rings may include a plurality of light sources, for example, LEDs. The light sources may be mounted to any one of the rings of fixture 140 as shown and described with respect to FIGS. 8 and 9.

In addition, according to aspects of the invention, at least one of the plurality of first cords 142, at least one of the plurality of the second cords 144, at least one of the plurality of third cords 146, at least one of the plurality of fourth cords 248, and/or at least one of the plurality of fifth cords 249 may comprise one or more wires adapted to transmit electrical power to the plurality of light sources in rings 141, 143, 145, and/or 247. As described in FIGS. 10-12 above, light fixture 140 typically includes a canopy assembly 147 adapted to mount to a surface, and provide electrical power to one or more of cords 142, 144, 146, 248, and/or 249 to illuminate light sources in any one or more of the rings of fixture 140. At least some of the cords 142, 144, 146, 248, and/or 249 may include ornaments 148 as described below with respect to FIGS. 17 through 20.

Figure 16:
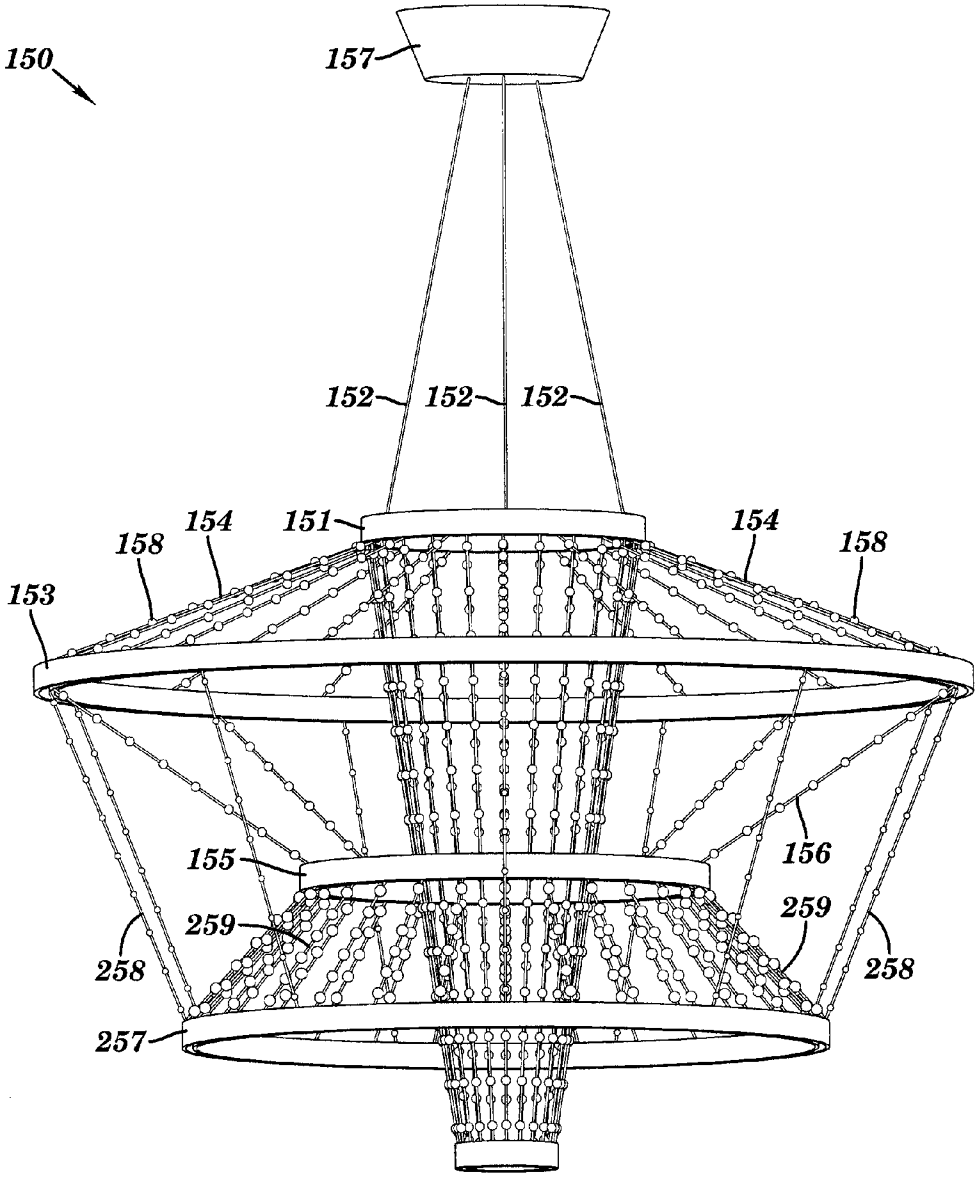

FIG. 16 is a perspective view of a light fixture 150 having a first ring 151 suspended by a plurality of first cords 152, a second ring 153 suspended by a plurality of second cords 154 from first ring 151, a third ring 155 suspended from second ring 153 by third cords 156, and a fourth ring 257 suspended by a plurality of fourth cords 258 from second ring 153 and a plurality of fifth cords 259 from third ring 155. In one aspect, fourth ring 257 may be suspended from second ring 153 alone by the plurality of cords 258, from third ring 155 alone by the plurality of cords 259, or from first ring 151 alone by a plurality of cords (not shown) or from first ring 151 and from second ring 153 or from third ring 155. Other possible mounting arrangements may be recognizable to those of skill in the art while still being within the purview of the present invention. According to aspects of the invention, the first ring 151, the second ring 153, the third ring 155, fourth ring 257, or any combination of the four rings may include a plurality of light sources, for example, LEDs. The light sources may be mounted to any one of the rings of fixture 150 as shown and described with respect to FIGS. 8 and 9.

In addition, according to aspects of the invention, at least one of the plurality of first cords 152, at least one of the plurality of the second cords 154, at least one of the plurality of third cords 156, at least one of the plurality of fourth cords 258, and/or at least one of the plurality of fifth cords 259 may comprise one or more wires adapted to transmit electrical power to the plurality of light sources in rings 151, 153, 155, and/or 257. As described in FIGS. 10-12 above, light fixture 150 typically includes a canopy assembly 157 adapted to mount to a surface, and provide electrical power to one or more of cords 152, 154, 156, 258, and/or 259 to illuminate light sources in any one of the rings of fixture 150. At least some of the cords 152, 154, 156, 258, and/or 259 may include ornaments 158 as described below with respect to FIGS. 17 through 20.

As shown in FIGS. 15 and 16, the fourth ring 247, 257 may be positioned below first ring 141, 151; second ring 143, 153; and third ring 145, 155, and be larger in relative size than first ring 141, 151 and third ring 145, 155, for example, have a larger outside dimension, for example, a larger maximum lateral dimension 28 or 30 as shown in FIG. 2, such as, a width or diameter. However, in one aspect of the invention, the fourth ring 247, 257 may be positioned above first ring 141, 151 and second ring 143, 153; or between first ring 141, 151 and second ring 143, 153; or between second ring 143, 153 and third ring 145, 155. In addition, fourth ring 247, 257 in FIGS. 15 and 16, respectively, may be smaller in relative size than first ring 141, 151; second ring 143, 153; and third ring 145, 155; or even approximately the same relative size as either first ring 141, 151; second ring 143, 153; and/or third ring 145, 155. In one aspect, first ring 141, 151; second ring 143, 153; third ring 145, 155; and fourth ring 247, 257 may also be approximately the same relative size. First ring 141, 151; second ring 143, 153; third ring 145, 155; and fourth ring 247, 257 may have a similar range of dimensions described with respect to FIGS. 2 and 3 above, and may have the similar features and construction as described with respect to FIGS. 8 and 9 above.

Figure 17:
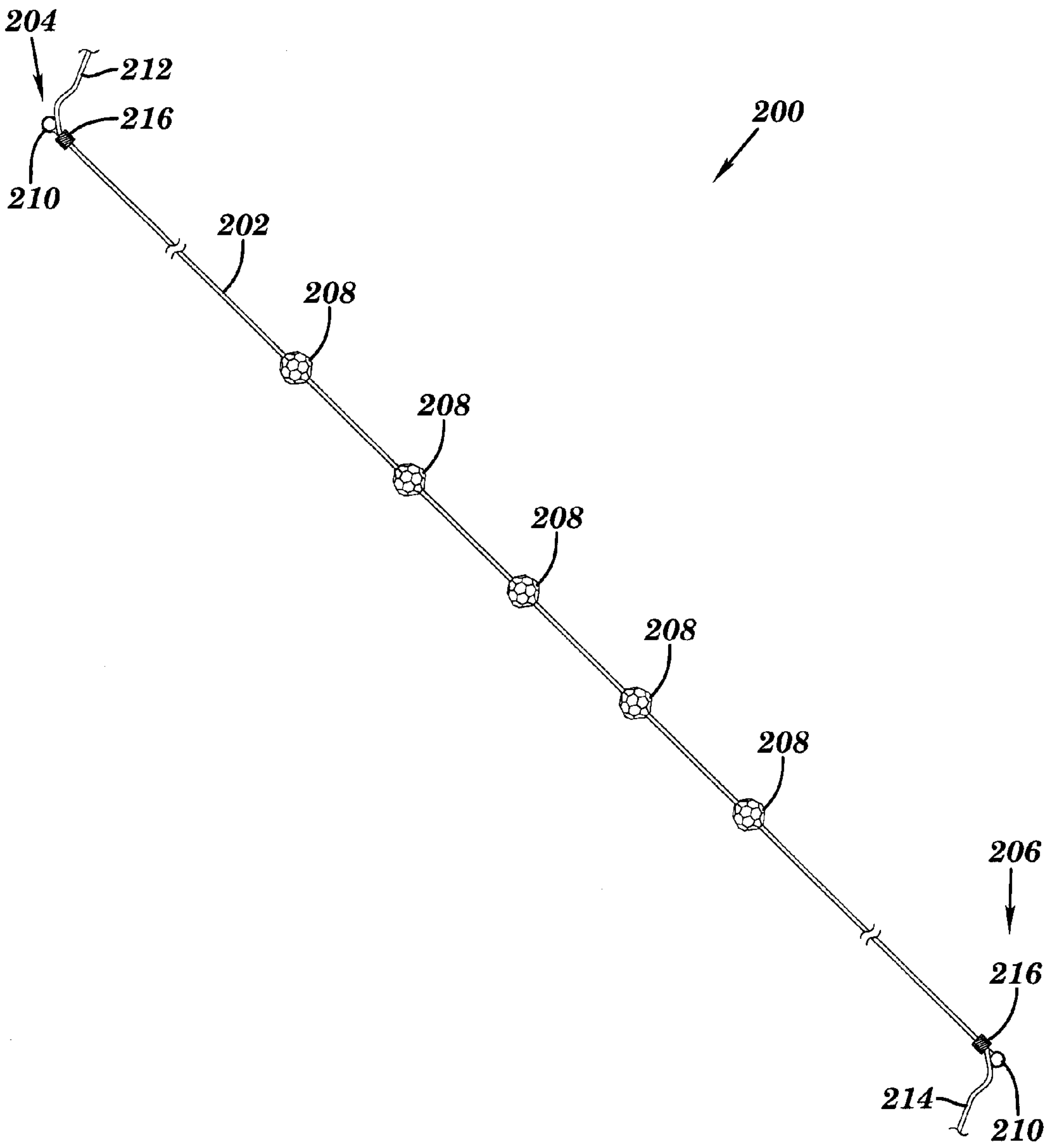
FIG. 17 is a perspective view of cord support assembly shown in FIG. 1 according to one aspect of the invention.

FIG. 17 is a detailed perspective view of a support assembly 200 that may be used to support rings of any one of the light fixtures shown in FIGS. 1 through 16 according to another aspect of the invention. As shown, support assembly 200 include a cord 202 having a first end 204 and a second end 206 opposite first end 204 and a plurality of ornaments 208 mounted on cord 202 between first end 204 and second end 206. Cord 202 may be any conventional mounting cord or wire, for example, a stainless-steel twisted wire. Cord 202 may be metallic or non-metallic, for example, plastic. Cord 202 may typically be insulated cord, especially when cord 202 transmits electric power.

Ornaments 208 of support assembly 200 may be evenly distributed, for example, at a relatively constant spacing or pitch, along cord 202. Ornaments 208 may be any conventional ornament, for example, ornaments 208 may be crystal ornaments, such as, spherical crystals, cubic crystals, diamond-shaped crystals, kite-shaped crystals, baguettes, pendeloques, icicle-shaped crystals, pear-shaped crystals, or any of the crystal shapes illustrated on the web page http://www.schonbek.com/ws/web/sch_about_crystal.html (the disclosure of which is included by reference herein) provided by Schonbek Worldwide Lighting Inc. Though aspects of the invention are preferably composed of transparent, translucent, or opaque glass, it is conceived that aspects of the invention may employ ornaments 208 made from transparent, translucent, or opaque plastic, stone, or precious gems, for example, natural or synthetic gems, such as, diamonds, rubies, or sapphires. The ornaments may comprise ornaments, for example, glass crystals, provided by the D. Swarovski Company of Wattens, Austria, or their equivalent.

Ornaments 208 may be mounted to cord 202 by conventional means, for example, ornaments 208 may have a through hole through which cord 202 can be threaded and then each ornament 208 secured to cord 202 with an adhesive, for example, a glue or an epoxy.

In one aspect, support 200 may be mounted to any one of the rings disclosed in the light fixtures shown in FIGS. 1 through 16 by conventional means, for example, using conventional mechanical fasteners mounted to end 204 and end 206. As shown in FIG. 17, in one aspect, first end 204 and second end 206 may include a bracket or grommet 210 adapted to mount to chord 202 and mount support assembly 200 to a ring as disclosed herein. For example, bracket or grommet 210 may have a hollow cylindrical body that can be crimped to cord 202 by conventional means, and a circular aperture adapted to be mounted to a ring, for example, with conventional mechanical fasteners.

In one aspect of the invention, support assembly 200 may be adapted to transmit electric power, for example, electric current, from a power source to light sources, for example, light sources 58 shown in FIGS. 8 and 9, positioned in one or more rings of fixtures disclosed herein. Accordingly, in one aspect, cord 202 may be adapted to receive and transmit the desired electrical power. As shown in FIG. 17, cord 202 may be electrically connected to electrical-power-bearing wire 212, or cord 202 may comprise a portion of electrical-power-bearing wire 212, where electrical-power-bearing wire 212 may be operatively connected to a power source, for example, to one or more of power supplies 78 and 80 shown in FIGS. 10-12. Similarly, second end 206 of cord 202 may be electrically connected to wire 214, or cord 202 may comprise a portion of wire 214, which is capable of bearing electric current and operatively connected to one or more light sources, for example, light sources 58 shown in FIGS. 8 and 9. For example, wire 214 may be eclectically connected to one or more of wires 70 or 72 shown in FIG. 9.

In the aspect of the invention where cord 202 carries electric current, precautions may be taken to minimize or prevent electric shock or electric shorts from cord 202. For example, as shown in FIG. 17, in one aspect, support assembly 200 may include one or more insulating devices or sleeves 216 mounted adjacent end 204 and end 206 of cord 202. Insulating devices 216 may be provided to electrically insulate cord 202 from the structure, typically, a ring (not shown) of a fixture disclosed herein, from contact with cord 202. As shown, insulating devices 216 may comprise a cylindrical sleeve having a through hole through which cord 202 may be passed. Insulating sleeve 216 my typically comprise an electrically insulating material, for example, a plastic, such as, GE Lexan polycarbonate. According to aspects of the invention, support assembly 200 may be mounted to a ring (not shown), for example, a metallic ring, of a fixture disclosed herein, and sleeve 216 may isolate cord 202 from the ring. In addition, insulating sleeves 216 may protect the insulation about cord 202 from being damaged or cut when brackets 210 or 230 are mounted, for example, crimped, to cord 202.

Figure 18:
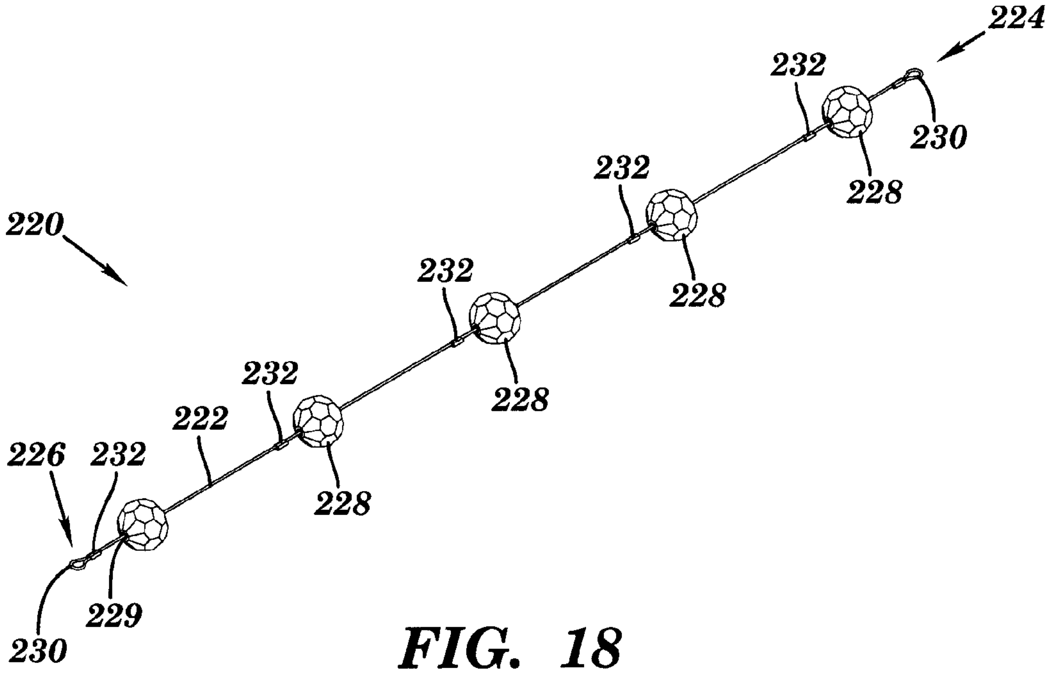
FIGS. 18 through 20 are perspective views illustrating the sequential mounting of ornaments to a cord according to another aspect of the invention.
Figure 19:
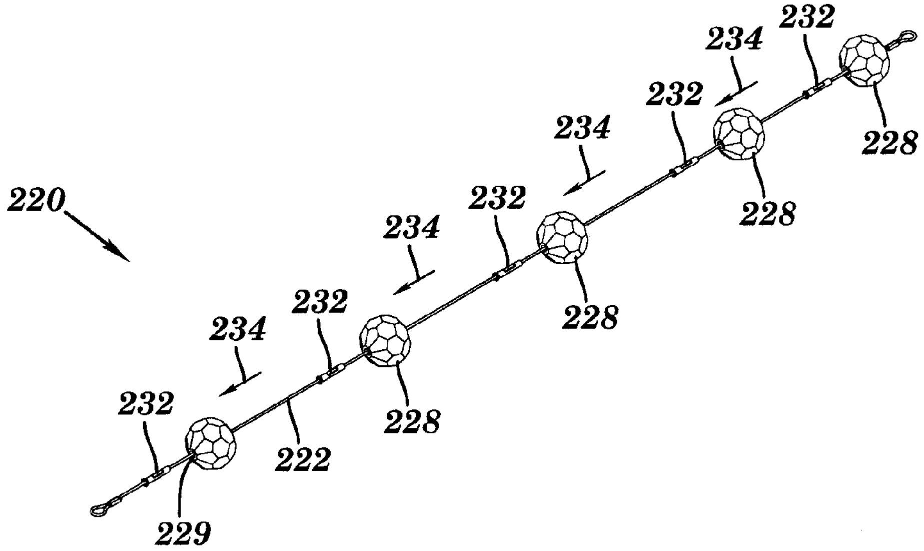
Figure 20:
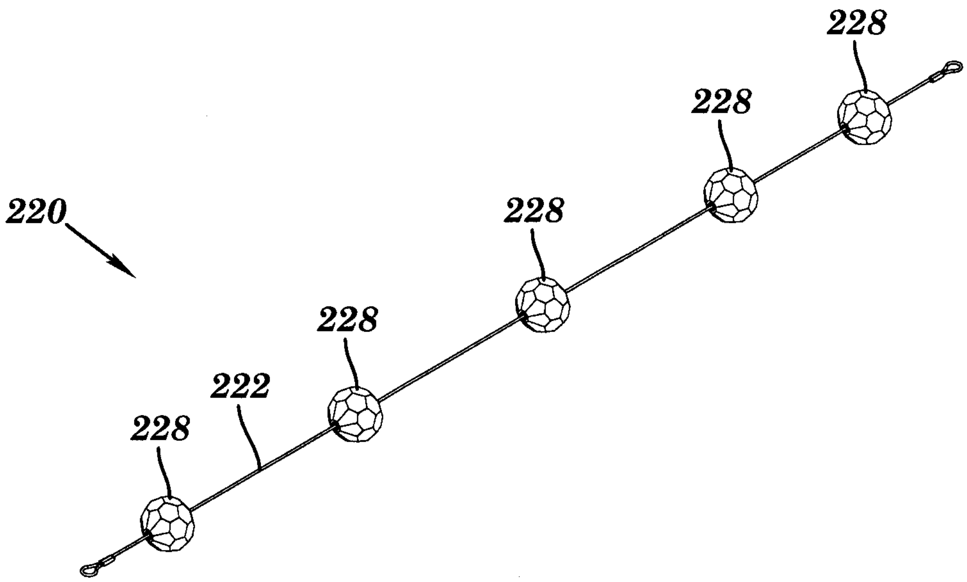

FIGS. 18 through 20 are perspective views illustrating the sequential mounting of ornaments to a cord according to another aspect of the invention. Though, as discussed above with respect to FIG. 17, ornaments may be mounted to cord 202 with the use of an adhesive, FIGS. 18 through 20 illustrate an alternate method and apparatus 220 for mounting ornaments to cord, cable, or wire according to another aspect of the invention. FIG. 18 is a perspective view of a support assembly 220 that may be used to support rings of any one of the light fixtures shown in FIGS. 1 through 16 and/or to provide electrical power to light sources according to one aspect of the invention.

FIG. 18 illustrates support assembly 220 prior to final assembly. As shown, support assembly 220 include a cord 222 having a first end 224 and a second end 226 opposite first end 224 and a plurality of ornaments 228 to be mounted on cord 222 between first end 224 and second end 226. Cord 222 may be any conventional mounting cord or wire, for example, a stainless-steel twisted wire. Cord 222 may be metallic or non-metallic, for example, plastic. As shown, ornaments 228 may be evenly distributed, for example, at a relatively constant spacing or pitch, along cord 222. Ornaments 228 may be any conventional ornament, for example, ornaments 228 may be ornaments described above with respect to ornaments 208. Ornaments 228 typically have at least one through whole 229.

Figure 27:
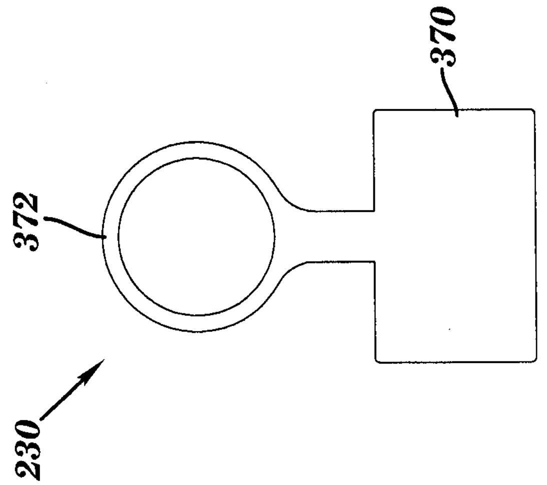
FIG. 27 is side view of a development of the bracket shown in FIG. 26, prior to forming.
Figure 26:
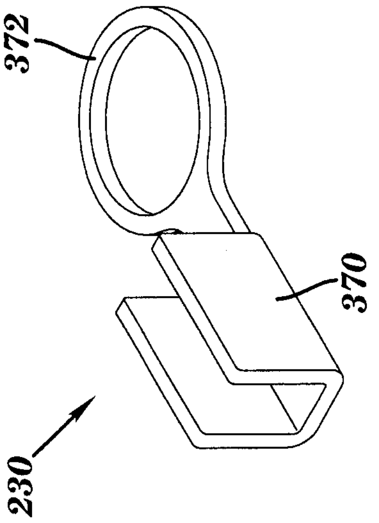
FIG. 26 is a perspective view of a cord retaining device shown in FIG. 22 according to an aspect of the invention.

In one aspect, support assembly 220 may be mounted to any one of the rings disclosed in the light fixtures shown in FIGS. 1 through 16 by conventional means, for example, using conventional mechanical fasteners mounted to end 224 and end 226. As shown in FIG. 18, in one aspect, first end 224 and second end 226 may be fashioned into a loop or provided with a grommet 230 adapted to mount support assembly 220 to a fixture or support, for example, to one of the rings of the light fixtures disclosed herein. For example, a grommet 230 may have a hollow cylindrical body that can be crimped to cord 222 by conventional means, and a circular aperture adapted to be mounted to a fixture or support, for example, with conventional mechanical fasteners. One example of a grommet 230 that may be used in aspects of the present invention is shown in FIGS. 26 and 27. In a fashion similar to support assembly 200 shown in FIG. 17, support assembly 220 may be adapted to transmit electric power, for example, electric current, from a power source and directed to light sources, for example, light sources 58 shown in FIGS. 8 and 9, positioned in one or more rings of fixtures disclosed herein.

According to the aspect of the invention shown in FIGS. 18-20, ornaments 228 may be mounted to cord 222 by first mounting a plurality of ferrules 232 to cord 222, for example, by crimping ferrules 232 to cord 222, and then threading ornaments 228 along cord 222 until ferrules 232 engage the through hole 229 whereby ferrule 232 supports ornament 228 on cord 222. In one aspect, cord 222 is oriented generally in a vertical position and ferrules 232 support ornaments 228 under the force of the weight of ornament 228. In another aspect, the mounting of ornaments 228 to ferrules 232 by be enhanced with the addition of an adhesive, such as, a glue or an epoxy.

Ferrules 232 may comprise any structure, for example, any cylindrical structure, adapted to be mounted to cord 222, for example, to be crimped to cord 222 or mounted to cord 222 with an adhesive, and support ornaments 228. In one aspect, ferrules 232 are sized to penetrate the through hole of ornament 228, for example, where ferrule 232 is substantially inserted into through hole 229 whereby ferrule 232 is not exposed. In one aspect, ferrule 232 is sized to be concealed within ornament 228, for example, wherein ferrule 232 may only be substantially visible through the surface of a transparent or translucent ornament.

Figure 21:
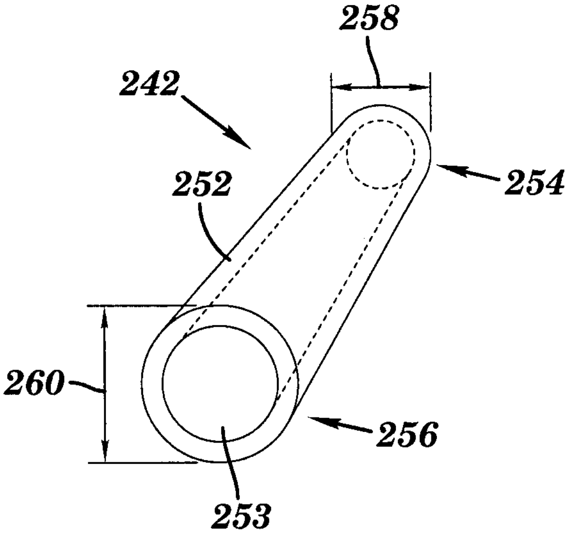
FIG. 21 is a perspective view of a ferrule that may be used for the aspect of the invention shown in FIGS. 18 through 20.

In one aspect, ferrule 232 may be ferrule having a model number SPC 4536 provided by SPC Technology of Vietnam. FIG. 21 is a perspective view of one such ferrule 242 that may be used for ferrule 232 described above. As shown in FIG. 21, ferrule 242 comprises a hollow cylindrical body 252 having a first end 254 and a second end 256. The hollow 253 of hollow cylindrical body 252 is sized receive cord 222. The body 252 is adapted to be crimped to cord 222 with a conventional crimping tool. According to an aspect of the invention, first end 254 comprises a diameter 258 sized to be received by through hole 229 of ornament 228 and second end 256 comprises a diameter 260 sized to be larger than the diameter of through hole 229 whereby second end 256 can support ornament 228 when engaged in through hole 229. According to one aspect, diameter 260 is sized wherein at least a portion of the surface of second end 256 having diameter 260 contacts an internal surface of through hole 229 of ornament 228 to support ornament 228 on cord 222.

FIGS. 19-21 also illustrates a method supporting at least one ornament 228 on a cord 222. The method may comprise first mounting a ferrule 232, 242 to a cord 222, for example, by crimping ferrule 232, 242 to cord 22, and then threading an ornament 228 having a through hole 229 onto cord 222 and engaging the through hole 229 with ferrule 232, 242 whereby by ferrule 232, 242 supports ornament 228 on cord 222. In one aspect, the method can be repeated wherein a first ferrule 232, 242 is mounted to cord 222, a first ornament 228 is mounted to ferrule 232, 242 and then a second ferrule 232, 242 is mounted to cord 222, for example, above the first ferrule 232, 242 and a second ornament 228 is mounted to the second ferrule 232, 242. In like manner, more ferrules 232, 242 and further ornaments 228 may be mounted to cord 222. Those of skill in the art well recognize that care must be taken to avoid mounting a second ferrule 232, 242 to cord 222 prior to mounting the first ornament 228 to the first ferrule 232, 242 to prevent second ferrule 232, 242 from interfering with the sliding of the first ornament 228 into engagement with the first ferrule 232, 242.

Figure 22:
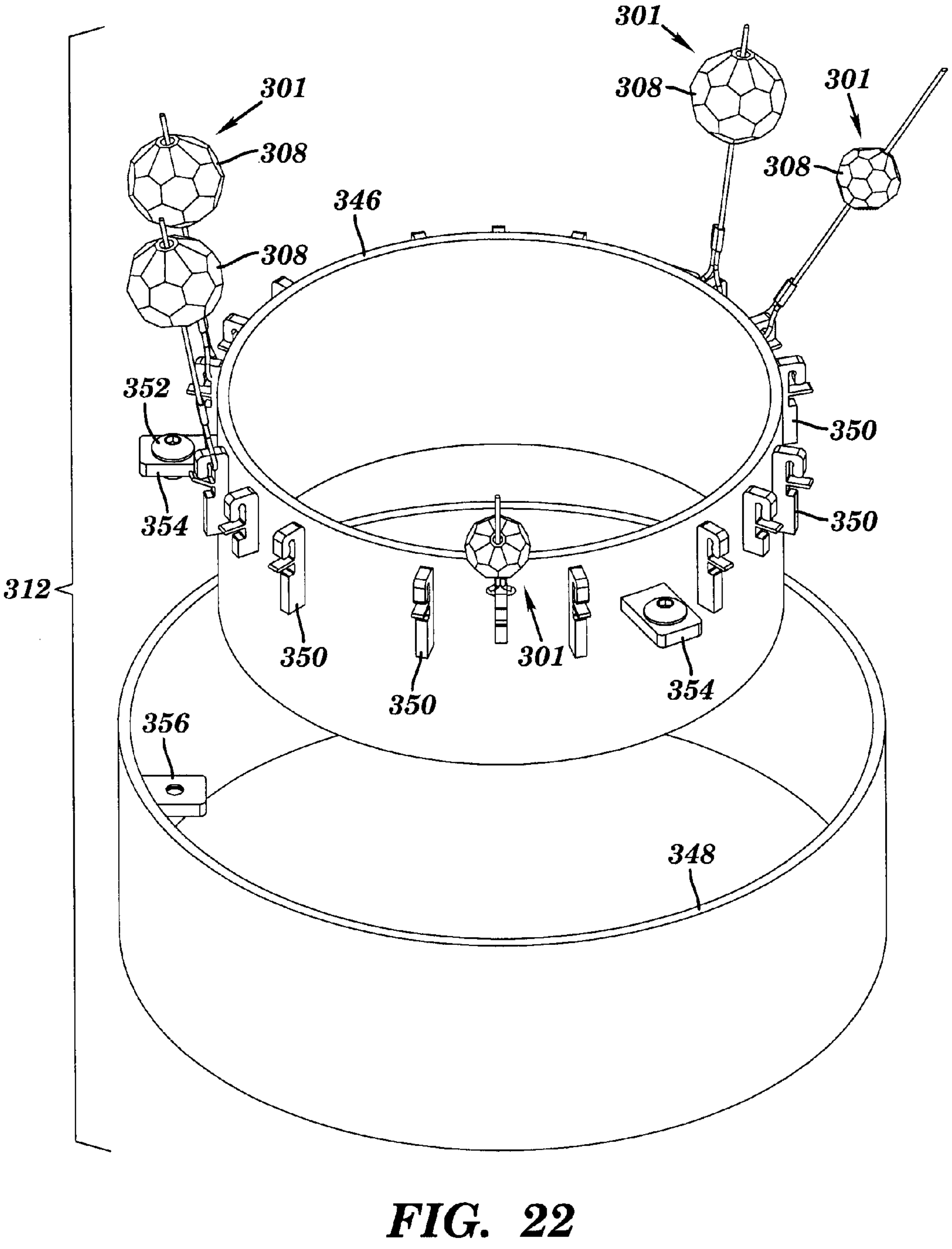
FIG. 22 is a partially exploded perspective view of the mounting of mounting of the cords shown in FIGS. 18 through 20 according to one aspect of the invention.

According to the aspect of the invention shown in FIGS. 19-21, a support assembly 220 is provided having a cord 222 adapted to support a fixture, for example, to support one of the rings of the light fixtures disclosed herein, and a plurality of ornaments 228 mounted to cord 222 with little or no visibility of the structure, for example, a ferrule 232, 242 used to mount ornaments 228. Aspects of the present invention provide a method and apparatus for mounting ornaments that facilitates assembly while enhancing the appearance of the ornament mounting for the consumer. FIG. 22 is a partially exploded perspective view of the mounting of mounting of ht cords shown in FIGS. 18 through 20 according to one aspect of the invention.

Figure 25:
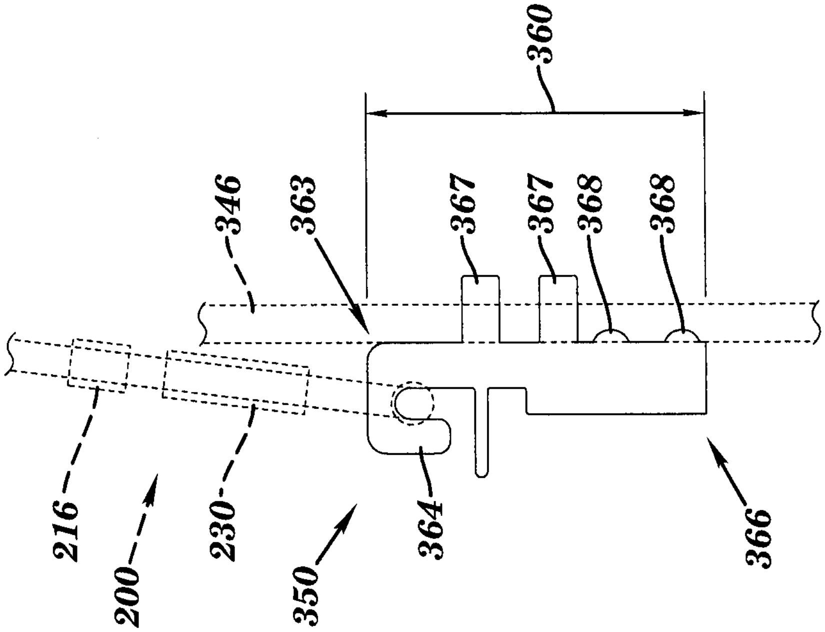
FIG. 24 is top view and FIG. 25 is a side elevation view of the bracket shown in FIG. 23.
Figure 23:
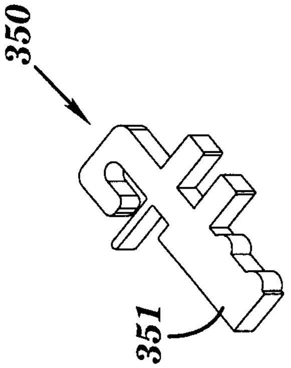
FIG. 23 is a perspective view of a cord mounting bracket shown in FIG. 22 according to an aspect of the invention.
Figure 24:
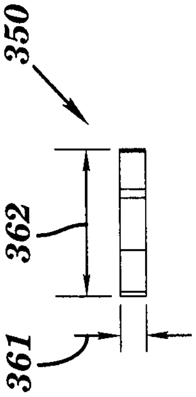

FIG. 22 is a partially exploded perspective view of the mounting of mounting of the cords shown in FIGS. 18 through 20 according to one aspect of the invention. FIG. 22 shows a typical ring assembly 312 having an inner wall 346 and an outer wall 348, for example, similar to and having all the attributes of rings 12 or 16 having inner wall 46 and outer wall 48 shown in FIGS. 8 and 9. Inner wall 346 and outer wall 348 may be joined by multiple mounting plates 354, 356 mounted respectively to inner wall 346 and outer wall 348 and coupled with mechanical fasteners 352, for example, in a manner similar to mounting plates 54 and 56 shown in FIGS. 8 and 9. FIG. 22 shows several cord assemblies 301, which may be similar to cord assemblies 200 and 220 shown in FIGS. 17 through 20, having ornaments 308. As shown, in one aspect of the invention, cords assemblies 301 may be attached to inner wall 346 and/or outer wall 348 by means of mounting brackets 350. As shown in FIG. 22, a plurality of mounting brackets 350 may be mounted to the external surface of inner ring 348, for example, by welding, soldering, or an adhesive. In one aspect, mounting brackets 350 may be attached to the inner or outer surface of outer ring 348, or to the inner surface of inner ring 346. Detailed illustrations of one mounting bracket 350 are shown in FIGS. 23, 24, and 25. FIG. 23 is a perspective view of a cord mounting bracket 350 shown in FIG. 22 according to an aspect of the invention. FIG. 24 is top view and FIG. 25 is a side elevation view of the bracket 350 shown in FIG. 23. In FIG. 25, a represeentiaonlve section of inner ring 346 onto which bracket 350 mounts is shown in phantom, and a cable assembly 200 mounted to bracket 350 having grommet 210/230 and insulator 216 shown in phantom. As shown in FIG. 23-25, bracket 350 comprises a body 351, for example, a thin stainless steel body 351 having a thickness 362, for example, a thickness ranging from about 0.03 to about 0.125 inches, for example, about 0.6 inches. Bracket 350 ahs a first end 363 having a hook 364 and a cable retainer 365 positioned and sized to minimize or prevent disengagement of the cord assembly 200, and a second end 366. Opposite the hook 364 body 351 includes a plurality of projections 367 and 368 adapted to engage inner wall 346, for example. For example, inner wall 346 may typically have recesses or through holes positioned to receive one or more of projections 357 and 358. Bracket 350 may typically have a height 360 of between about 0.125 inches to about 3 inches, for example, about 0.549 inches; and a width 362 of between about 0.125 inches and about 1.0 inches, for example, about 0.326 inches.

FIG. 26 is a perspective view of a cord retaining device or grommet 230 shown in FIGS. 17 through 21 and 22 according to an aspect of the invention. FIG. 27 is side view of a development of the grommet 230 shown in FIG. 26, prior to forming. According to aspects of the invention, grommet 230 is adapted to mount to a cable, for example, cables 202 and 222 shown in FIGS. 17 through 20 and attach a cable to a ring, for example, to inner wall 346 or outer wall 348 shown in FIG.

22. As shown in FIGS. 26 and 27, grommet 230 may include a body 370 and an eyelet 372 mounted to body 370. According to aspects of the invention, body 370 is adapted to mount to, for example, be crimped to, a cable, and eyelet 372 is adapted to engage a mounting bracket, for example, mounting bracket 350 shown in FIG. 23 through 25, mounted to an inner or outer wall of a ring. According to aspects of the invention, body 370 may be fabricated from thin metal, for example, stainless steel, having a thickness between about 0.01 inches and 0.125 inches, typically, about 0.02 inches. Eyelet 372 may typically have an inside diameter of between about 0.0625 inches and about 0.50 inches, for example, about 0.098 inches. As shown, body 370 may be fabricated by first stamping or cutting the blank shown in FIG. 27, and then forming the body 370 into a U-shape as shown in FIG. 26. The U-shape of body 370 may then be crimped to a cable as is conventional.

Figure 28:
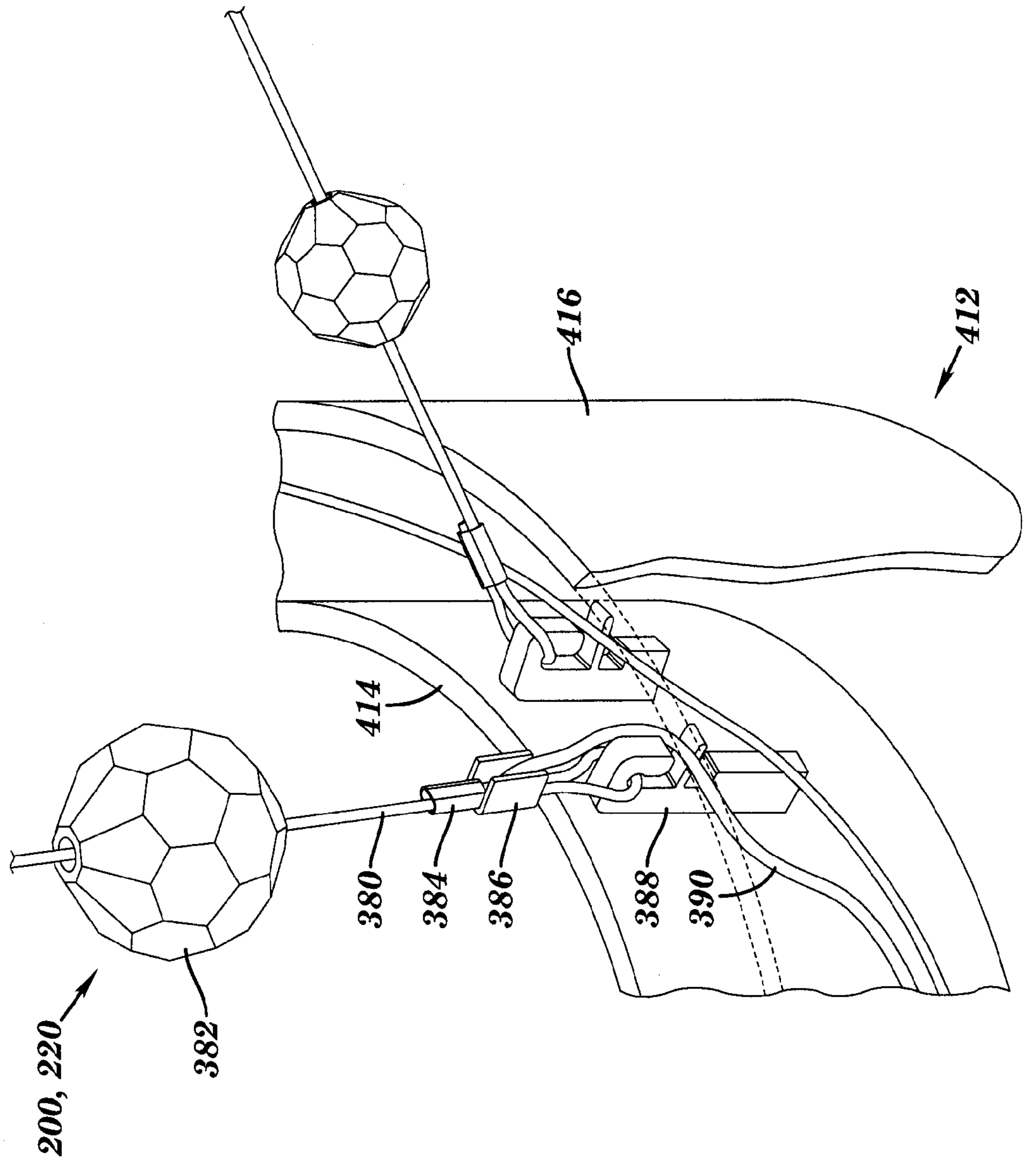
FIG. 28 is a partial perspective view of the mounting of the cord shown in FIGS. 18 through 20 according to an aspect of the invention.

FIG. 28 is a partial perspective view of the mounting of the cord assemblies 200, 220 shown in FIGS. 18 through 20 to ring 412 according to an aspect of the invention, for instance, in a fashion where cord assemblies 200, 220 are adapted to transmit electric power to a light source (not shown) mounted in ring 412, for example, in a ring 12 and/or 16, or any other ring disclosed herein. Ring 412 includes an inner wall 414 and an outer wall 416, for example, similar to walls 46 and 48 shown in FIGS. 8 and 9. As shown in FIG. 28, cable assemblies 200, 220 include a cable 380, for example, an electric power transmitting cable 380 operatively connected to a source of electric power, as described herein. Cable assembly 200, 220 may include at least one ornament 382. Cable assemblies 200, 220 also include one or more insulation sleeve 384 and a grommet 386, for example, as showing in FIGS. 26 and 27 mounted to cable 380, again, typically, by crimping. As shown, the eyelet of grommet 386 is attached to inner wall 414 by a mounting bracket 388, such as, mounting bracket 350 shown in FIGS. 23, 24, and 25. According to one aspect of the invention, the mounting of cable assemblies 200, 220 may permit the cable 380 of cable assembly 200, 220 to pass through grommet 386 as electric power carrying cable 390, for example, an extension of the cable 380 of cable assembly 200, 220, and provide electric power to light sources (not shown) in ring 412. For example, cable 390 may be electrically coupled to one or more of wires 70 and 72 in FIG. 9 to power light sources 58.

Aspects of the present invention provide light fixtures, methods, and devices that overcome the disadvantages of the prior art. For example, aspects of the present invention provide light fixture and methods of mounting light sources and lights fixtures that allow for the routing of electrical power through supporting elements to obviate the need to provide structures in the light fixture to conceal the typically unsightly power cords. Accordingly, aspects of the present invention allow the lighting designer to provide fixtures which under the constraints of prior art wire routing limitations could not be possible. As will be appreciated by those skilled in the art, features, characteristics, and/or advantages of the various aspects described herein, may be applied and/or extended to any embodiment (for example, applied and/or extended to any portion thereof).

Although several aspects of the present invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

The invention claimed is:

1. A light fixture comprising:

a first ring suspended by a plurality of first cords;

a second ring suspended by a plurality of second cords from the first ring, the second ring being spaced from said first ring;

wherein at least one of the first ring and the second ring comprises a plurality of light sources; and wherein at least one of the plurality of first cords and at least one of the plurality of the second cords are adapted to transmit electrical power to the plurality of light sources.

2. The light fixture as recited in claim 1, wherein at least one of the first ring and the second ring comprises a circular ring, an elliptical ring, and a polygonal ring.

3. The light fixture as recited in claim 1, wherein the plurality of light sources are positioned to direct light in an axial direction.

4. The light fixture as recited in claim 3, wherein the axial direction comprises a vertical direction.

5. The light fixture as recited in claim 4, wherein the vertical direction comprises one of an upward vertical direction and a downward vertical direction.

6. The light fixture as recited in claim 1, wherein the light fixture further comprises at least one third ring suspended from at least one of the first ring and the second ring by a plurality of third cords.

7. The light fixture as recited in claim 6, wherein the at least one third ring comprises a plurality of light sources positioned to direct light in an axial direction; and wherein at least one of the plurality of third cords are adapted to transmit electrical power to the plurality of light sources in the third ring.

8. The light fixture as recited in claim 1, wherein the light fixture further comprises a plurality of ornaments mounted to at least one of the plurality of first cords and the plurality of second cords.

9. The light fixture as recited in claim 1, wherein the first ring comprises a maximum lateral dimension and wherein the second ring comprises a maximum lateral dimension greater than the maximum lateral dimension of the first ring.

10. The light fixture as recited in claim 1, wherein the first ring comprises a maximum lateral dimension and wherein the second ring comprises a maximum lateral dimension less than the maximum lateral dimension of the first ring.

11. A method for suspending a plurality of light sources, the method comprising:

suspending a first ring by a plurality of first cords;

suspending a second ring by a plurality of second cords from the first ring, the second ring being spaced from said first ring, wherein at least one of the first ring and the second ring comprises a plurality of light sources and wherein at least one of the plurality of first cords and at least one of the plurality of the second cords are adapted to transmit electrical power; and powering the plurality of light sources through the at least one of the plurality of first cords adapted to transmit electrical power and the at least one of the plurality of second cords adapted to transmit electrical power.

12. The method as recited in claim 11, wherein the method further comprises directing light from the light sources in an axial direction.

13. The method as recited in claim 11, wherein at least one of the first ring and the second ring comprises a circular ring, an elliptical ring; and a polygonal ring.

14. The method as recited in claim 11, wherein the plurality of light sources are adapted to direct light in axial direction.

15. The method as recited in claim 14, wherein the axial vertical direction comprises one of an upward vertical direction and a downward vertical direction.

16. A light fixture comprising:

a first circular ring suspended by a plurality of first cords, the first circular ring having an outer diameter and a first plurality of light sources positioned to direct light in an axial direction;

a second circular ring suspended by a plurality of second cords and spaced from the first circular ring, the second circular ring having an outer diameter greater than the outer diameter of first circular ring and a second plurality of light sources positioned to direct light in an axial direction;

wherein at least one of the plurality of first cords is adapted to transmit electrical power to the first plurality of light sources; and wherein at least one of the plurality of the second cords is adapted to transmit electrical power to the second plurality of light sources.

17. The light fixture as recited in claim 16, wherein the light fixture further comprises at least one third circular ring suspended from at least one of the first circular ring and the second circular ring by a plurality of third cords, the at least one third circular ring having a third plurality of light sources positioned to direct light in a downward direction, and wherein at least one of the plurality of the third cords is adapted to transmit electrical power to the third plurality of light sources.

18. The light fixture as recited in claim 16, wherein the light fixture further comprises a plurality of ornaments mounted to at least one of the plurality of first cords and the plurality of second cords.

19. The light fixture as recited in claim 18, wherein the plurality of ornaments comprise a plurality of ornamental crystals.

20. The light fixture as recited in claim 16, wherein at least one of the first plurality of light sources and the second plurality of light sources comprises a plurality of light emitting diodes (LEDs).

21. An ornament mounting comprising:

a cord;

an ornament having a through hole extending through the ornament; and a ferrule having a cylindrical body adapted to engage the cord, the cylindrical body having a first end having a first width less than a width of the through hole of the ornament, and a second end having a second width greater than the first width;

wherein, when the ferrule is engaged to the cord and the cord is passed through the through hole of the ornament, the first width of the first end of the ferrule penetrates into the through hole in the ornament and the second width of the second end of the ferrule engages the through hole of the ornament and supports the ornament on the cord.

22. The ornament mounting as recited in claim 21, wherein the cord comprises a cord suspended in a substantially vertical direction.

23. The ornament mounting as recited in claim 21, wherein the second width of the second end of the ferrule engages the through hole of the ornament comprises the second width at least partially contacts an inner surface of the through hole.

24. The ornament mounting as recited in claim 21, wherein the ferrule does not protrude from the through hole.

25. The ornament mounting as recited in claim 21, wherein the cylindrical body of the ferrule comprises one of circular cylindrical body and a polygonal cylindrical body.

26. The ornament mounting as recited in claim 21, wherein the second width of the second end of the ferrule comprises an annular projection.

27. The ornament mounting as recited in claim 21, wherein the cylindrical body of the ferrule adapted to engage the cord comprises a cylindrical body mounted to the cord.

28. The ornament mounting as recited in claim 27, wherein mounted to the cord comprises crimped to the cord.

29. The ornament mounting as recited in claim 21, wherein the second end of the ferrule engages the through hole of the ornament comprises a surface of the second end of the ferrule having the second width engages a surface of the through hole of the ornament.

30. The ornament mounting as recited in claim 21, wherein the cord comprises a wire.

31. A method of mounting an ornament having a through hole, the method comprising:

mounting a ferrule to a cord, the ferrule having a cylindrical body adapted to engage the cord, the cylindrical body having a through hole, a first end having a first width less than a width of the through hole of the ornament, and a second end having a second width greater than the first width;

passing the cord through the though hole of the ornament wherein the first end of the ferrule penetrates the through hole of the ornament; and engaging the through hole of the ornament with the second end of the ferrule to support the ornament on the cord.

32. The method as recited in claim 31, wherein after the method is practiced, the cord comprises a cord suspended in a substantially vertical direction.

33. The method as recited in claim 31, wherein engaging the second width of the second end of the cylindrical body of the ferrule with through hole comprises engaging the second end wherein the ferrule does not protrude from the through hole.

34. The method as recited in claim 31, wherein the cylindrical body of the ferrule comprises one of circular cylindrical body and a polygonal cylindrical body.

35. The method as recited in claim 31, wherein the second width of the second end of the cylindrical body of the ferrule comprises an annular projection.

36. The method as recited in claim 31, wherein mounting the ferrule to the cord comprises crimping the ferrule to the cord.

37. The method as recited in claim 31, wherein engaging the second width of the second end on the ferrule with the through hole in the ornament comprises contacting the second end with a surface of the through hole.

38. The method as recited in claim 31, wherein the cord comprises a wire.

39. The light fixture as recited in claim 1, wherein at least one of the first ring and the second ring includes an inner wall and a spaced apart outer wall and wherein the plurality of light sources being mounted between the inner wall and the outer wall.

40. The light fixture as recited in claim 39, wherein the outer wall is opaque.

41. The light fixture as recited in claim 40, wherein the light fixture further comprises a plurality of ornaments mounted to at least one of the plurality of first cords and the plurality of second cords.

42. The method as recited in claim 11, wherein at least one of the first ring and the second ring includes inner wall and a spaced apart outer wall and the plurality of light sources being mounted between the inner wall and the outer wall.

43. The method as recited in claim 42, wherein the outer wall is opaque.

44. The method as recited in claim 43, further comprising suspending a plurality of ornaments mounted to at least one of the plurality of first cords and the plurality of second cords.

45. The light fixture as recited in claim 16, wherein at least one of the first ring and the second ring includes an inner wall and a spaced apart outer wall and wherein the plurality of light sources being mounted between the inner wall and the outer wall.

46. The light fixture as recited in claim 45, wherein the outer wall is opaque.

47. The light fixture as recited in claim 46, wherein the light fixture further comprises a plurality of ornaments mounted to at least one of the plurality of first cords and the plurality of second cords.

* * * * *